US012608747B2

(12) United States Patent
Klingsberg et al.

(10) Patent No.: US 12,608,747 B2
(45) Date of Patent: Apr. 21, 2026

(54) CONDITION TREE OPTIMIZATION

(71) Applicant: Better Holdco, Inc., New York, NY (US)

(72) Inventors: Juliette Rembrandt Klingsberg, Brooklyn, NY (US); Sam Arthur Ross, Princeton, NJ (US); Hanson Yu, New York, NY (US)

(73) Assignee: Better Holdco, Inc., New York, NY (US)

(*) Notice: Subject to any disclaimer, the term of this patent is extended or adjusted under 35 U.S.C. 154(b) by 93 days.

(21) Appl. No.: 17/152,656

(22) Filed: Jan. 19, 2021

(65) Prior Publication Data

US 2022/0230249 A1 Jul. 21, 2022

(51) Int. Cl.
*G06Q 40/06* (2012.01)
*G06F 16/901* (2019.01)
*G06Q 40/00* (2023.01)

(52) U.S. Cl.
CPC ......... *G06Q 40/06* (2013.01); *G06F 16/9027* (2019.01); *G06Q 40/00* (2013.01)

(58) Field of Classification Search
CPC .............................. G06F 16/9027; G06Q 40/06
See application file for complete search history.

(56) References Cited

U.S. PATENT DOCUMENTS

| | | | |
|---|---|---|---|
| 6,745,384 B1 | 6/2004 | Biggerstaff | |
| 9,405,851 B1 * | 8/2016 | Steele, III | H04L 67/568 |
| 2005/0246686 A1 * | 11/2005 | Seshadri | G06N 5/046 |
| | | | 717/117 |
| 2020/0050953 A1 * | 2/2020 | Fischbacher | G06F 8/41 |

FOREIGN PATENT DOCUMENTS

| | | | | |
|---|---|---|---|---|
| WO | WO-2016004073 A1 * | 1/2016 | ............. | G06N 20/00 |
| WO | 2020231529 A1 | 11/2020 | | |

OTHER PUBLICATIONS

Dr. Christian Mayer ("How to Assign a Function to a Variable in Python?", Finxter.com, 2021) teaches how to assign a function as a variable. (Year: 2021).*
Riptutorial ("Functions as a variable", 2020) teaches one can use variables to refer to named functions. (Year: 2020).*
Search Report and Written Opinion for PCT/US2022/012949 mailed Apr. 8, 2022, pp. 13.

* cited by examiner

*Primary Examiner* — Christine M Tran
*Assistant Examiner* — Chinedu U. Ekechukwu

(57) ABSTRACT

Aspects of the present disclosure relate to condition tree optimization techniques. In examples, a condition tree is comprised of rules and associated logical operators. The condition tree is used to process a set of variables, thereby generating an evaluation result. In some instances, multiple evaluations are performed, for example to identify variables that affect the evaluation result of the condition tree. As compared to dynamic variables that may change across various iterations, certain variables may be static. Subparts of the condition tree associated with such static variables may be identified, such that they may be evaluated and replaced with a resulting processing result, thereby generating an "optimized" condition tree. Thus, the optimized condition tree may comprise dynamic subparts and processing results in place of static subparts. The condition tree may be processed to identify variables that negatively affect an evaluation result, which may be identified as candidate variables for change.

20 Claims, 13 Drawing Sheets

300

302 — RECEIVE CONTEXT

304 — ACCESS CONDITION TREE

306 — SELECT NODE IN CONDITION TREE

308 — RESULT OF NODE DEPENDENT ON CONTEXT?   NO

YES

310 — ADD ASSOCIATED VARIABLE TO SET OF DYNAMIC VARIABLES

312 — REMAINING NODES?   YES

NO

314 — PROVIDE SET OF DYNAMIC VARIABLES

460

PROCESS SUBTREE ASSOCIATED
WITH "AND" LOGICAL OPERATOR   462

464   PROCESSING RESULT
FOR SUBPART?    NO    466   RETAIN CONDITION
TREE SUBPART

YES

468   "FALSE"
RESULT?    YES    470   RETURN FALSE

NO

YES    472   REMAINING
SUBPART?

NO

474   RETAINED SUBPART?    NO    476   RETURN TRUE

YES

478   UPDATE CONDITION TREE BASED
ON RETAINED SUBPART

CONDITION TREE OPTIMIZATION

BACKGROUND

Evaluating a condition tree using a set of variables may be computationally expensive. Additionally, performing repeated evaluations of the condition tree may further compound such issues, resulting in potentially redundant computations in instances where at least a part of the set of inputs remains unchanged.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to techniques for condition tree optimization. In examples, a condition tree is comprised of one or more rules and associated logical operators. The condition tree is used to process a set of variables, thereby generating an evaluation result. In some instances, multiple evaluations are performed using the condition tree, for example to identify variables that affect the evaluation result of the condition tree. As compared to other dynamic variables that may change across various iterations, certain variables may be static.

Subparts of the condition tree associated with such static variables may be identified, such that they may be evaluated and replaced with a resulting processing result, thereby generating an "optimized" condition tree. Thus, the optimized condition tree may comprise dynamic subparts (e.g., associated with dynamic variables) and processing results associated with processed static subparts. In some instances, the condition tree is further processed to identify candidate variables that negatively affect an evaluation result. For example, subparts may ultimately cause the condition tree to yield an evaluation result that is different than an expected or preferred evaluation result, such that associated variables may be identified as candidate variables for change, thereby improving the evaluation result.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
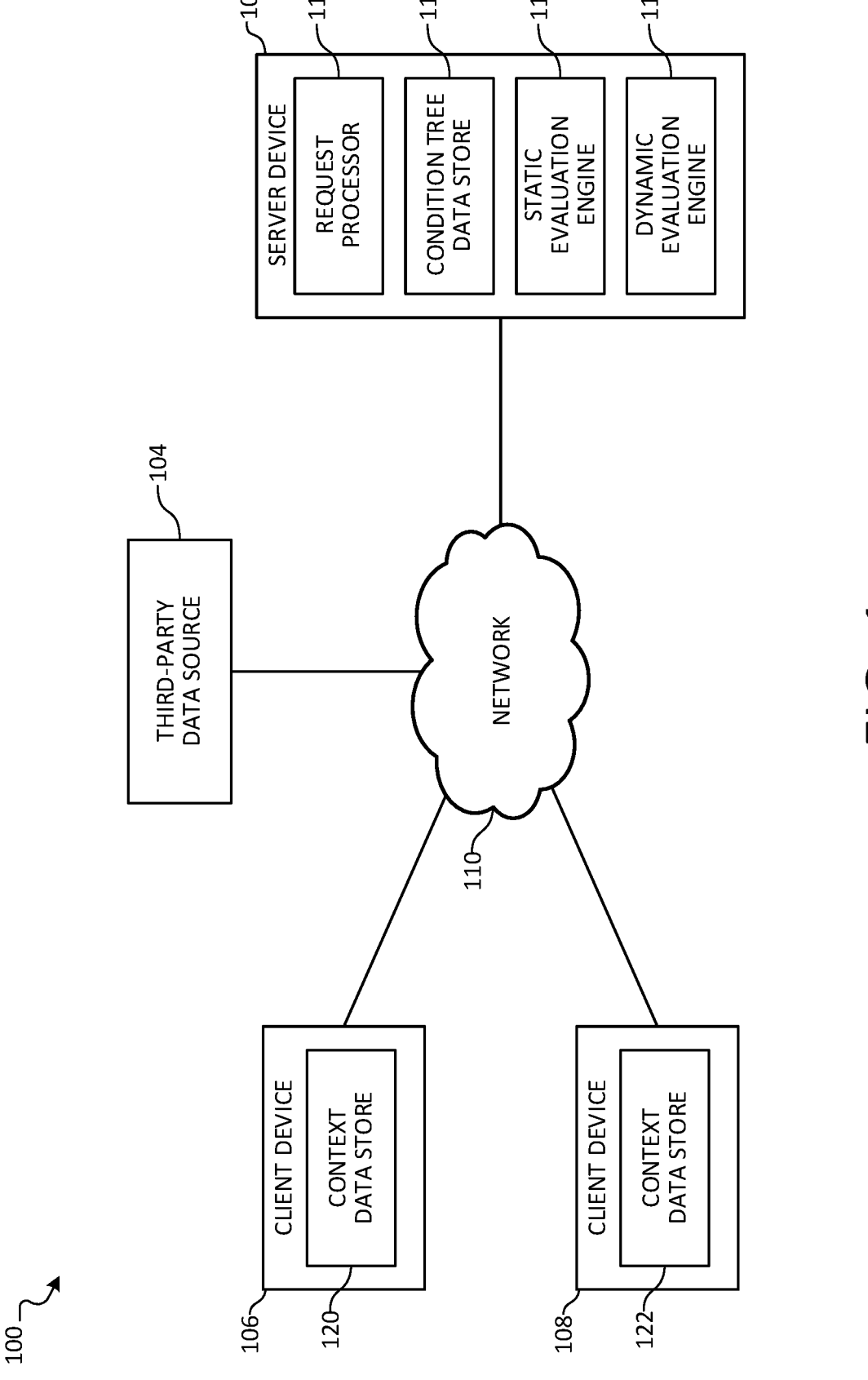
FIG. 1 illustrates an overview of an example system for condition tree optimization.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, a condition tree is evaluated using a set of variables. For example, the condition tree may specify a set of rules joined by one or more logical operators in a hierarchical structure, such that evaluating the set of variables using the condition tree yields an evaluation result (e.g., a Boolean true or false). However, as the size of the condition tree grows and/or the number of variables in the set increases, resource consumption (e.g., memory consumption or computational cost) associated with evaluating the condition tree may similarly increase (e.g., at a linear or exponential rate). In some instances, the condition tree may be repeatedly evaluated using a changing set of variables. For example, one or more variables in the set may be changed, while other variables retain a same or similar value. Accordingly, while a subpart of the tree associated with the changed set of variables may also change, another subpart of the tree may remain unchanged. Thus, not only may evaluating the condition tree have a high associated resource consumption, but performing repeated evaluations of the condition tree may further exacerbate these and other issues.

Accordingly, aspects of the present disclosure relate to condition tree optimization. In examples, a set of variables comprises a subset of static variables and a subset of dynamic variables. As used herein, a dynamic variable is a variable that has a value that may change between evaluations of the condition tree. As compared to a dynamic variable, a static variable may retain the same or a substantially similar value between evaluations of the condition tree. Thus, static variables of the set of variables may not have a substantial contribution to changes in how the condition tree is evaluated and/or the resulting evaluation of the condition tree.

A subpart of the condition tree may comprise one or more rules and, in some examples, associated logical operators. For example, a subpart may comprise a single rule and, in some examples, an associated operator (e.g., a "not" operator), or may comprise two or more rules joined by a logical operator (e.g., an "and" operator or an "or" operator). A rule may relate to one or more variables. For example, a rule may evaluate a variable as compared to a predetermined threshold (e.g., variable A>50 or variable B=10), may compare two variables (e.g., variable A<variable B or variable B=variable C), or may comprise any of a variety of other mathematical operations and comparisons (e.g., variable B+variable C>variable A or variable A/variable B>0.5). It will be appreciated that the rules described herein are provided as examples and that, in other examples, rules may comprise any of a variety of other evaluations. For example, a rule may comprise software instructions in addition to or as an alternative to such mathematical operations.

A logical operator of a condition tree is associated with one or more rules. For example, a "not" logical operator may invert a determination of an associated rule, such that the "not" operator may have one or more associated condition tree subparts. As another example, an "and" operator may indicate that both a first rule and a second rule evaluate to true for the operator to evaluate to true Similarly, an "or" operator may indicate that either a first rule or a second rule evaluate to true for the operator to evaluate to true. It will be appreciated that any number of rules may be associated with an operator. For example, an "and" operator need not be associated with only two rules and may instead be associated with three or more rules in other examples.

A condition tree may be processed to identify one or more subparts of the condition tree that are associated with static variables (which may be referred to herein as "static subparts"). Accordingly, a processing result of such a static subpart may be generated according to the associated static variables. The condition tree may be simplified to omit the static subpart, such that the processing result may be used in place of the static subpart. As used herein, a static subpart need not be comprised solely of static variables. Rather a static subpart may comprise any combination of static and dynamic variables in such a way that the subpart may be evaluated according to the static variables to yield a processing result. Thus, the processing result is determined for the static subpart regardless of (and, for example, in the absence of) values for any dynamic variables therein. Static subparts of the condition tree may be identified and replaced with associated processing results, thereby yielding an "optimized" condition tree comprising one or more processing results (e.g., generated according to static subparts and associated static variables) and one or more dynamic subparts (e.g., that are associated with dynamic variables). For example, the resulting optimized condition tree may no longer comprise static variables or associated static subparts. As used herein, an optimized condition tree is a condition tree that omits a static subpart in favor of an associated processing result. Thus, it will be appreciated that an optimized condition tree need not be a most optimized representation (or even a more optimized representation) of the condition tree.

Aspects of the present application are applicable to condition trees in any of a variety of contexts. For example, a condition tree may be used to evaluate a set of variables relating at least in part to a user (e.g., as may be stored by a user profile and/or received from a user) to determine a state associated with the user. As an example, the user profile may comprise financial attributes associated with the user (e.g., annual income, credit score, outstanding debt, and/or available assets), such that a condition tree is used to determine whether the user is eligible for a given financial instrument. In such an example, the set of variables may further comprise variables relating to a property (e.g., property value, number of rooms, and/or square footage) and/or the associated financial instrument, such as a loan value, an interest rate, and/or a loan term.

As another example, a condition tree may be processed to evaluate a set of options in order to generate a subset of options that satisfy the condition tree. For example, targeted content may be evaluated according to the condition tree to generate a subset of targeted content for display to a user. As another example, a set of users may be evaluated using a condition tree to determine a subset of users to recommend or otherwise present to a user. In some instances, a condition tree may be generated according to medical guidelines, such that the condition tree is used to diagnose or treat a user. Or, as another example, a condition tree may comprise laws and/or regulations, such that it may be determined if a given scenario satisfies the laws and/or regulations. Thus any of a variety of variables may be evaluated by a condition tree according to aspects described herein.

The condition tree may be generated according to any of a variety of techniques. For example, the condition tree may be generated at least in part on input received from a user and/or parsing information from a data source. For example, the data source may provide a set of requirements (e.g., in a human-readable format or in JavaScript Object Notation (JSON) or other machine-readable format), which is parsed to generate a condition tree.

Returning to the above example, the condition tree may be generated based at least in part on eligibility requirements associated with the financial instrument. Static variables in the above example may relate to the property. In some instances, a variable may be deemed "static" if it is not likely to change within a predetermined timeframe. For example, an annual income or a credit score associated with a user may be considered a static variable in some examples. By contrast, dynamic variables in the instant example may be the loan value, the interest rate, and/or the loan term.

Accordingly, the condition tree may be optimized according to aspects described herein, such that static subparts of the condition tree are not needlessly reevaluated when evaluating the eligibility of the user for variations of a financial instrument. The optimized condition tree may then be used to evaluate dynamic variables in order to determine which values enable the user to be eligible for an associated financial instrument. For example, the optimized condition tree may be evaluated according to different loan amounts to determine a range of loan amounts for which the condition tree indicates the user is eligible.

Using aspects of the present disclosure, the entire condition tree need not be reevaluated for each subsequent evaluation. Rather, an optimized condition tree is used such that processing results associated with one or more static subparts of the condition tree are used in place of evaluating the static subparts. As a result, resource consumption associated with evaluating the condition tree is reduced and may therefore predominantly comprise evaluating dynamic subparts of the condition tree.

In some instances, evaluating a condition tree further comprises identifying variables that negatively affect the evaluation (e.g., yield an evaluation result that is different from an expected or preferred result). In some instances, such an evaluation is performed using a condition tree that has been optimized according to aspects described herein. The evaluation may be performed in view of a set of fixed variables that cannot be changed. It will be appreciated that fixed variables are different from static or dynamic variables, where a fixed variable may be immutable or may be outside of the control of the user, while a static or dynamic variable may eventually change. Accordingly, the evaluation yields a set of candidate variables that may ultimately be changed by a user in order to cause the condition tree to output a different evaluation result. In some instances, the set of candidate variables is ranked according to the ease with which they are changed, such that variables that are easier to change are ranked higher than variables that are more difficult to change.

FIG. 1 illustrates an overview of an example system 100 for condition tree optimization. As illustrated, system 100 comprises server device 102, third-party data source 104, client device 106, client device 108, and network 110. In examples, server device 102, third-party data source 104, client device 106, and/or client device 108 communicate via network 110, which may comprise a local area network, a wireless network, or the Internet, or any combination thereof, among other examples.

Server device 102 and third-party data source 104 may each be any of a variety of computing devices, including, but not limited to, a server computing device or may each comprise a set of computing devices that form a distributed computing device. Client device 106 and client device 108 may each be any of a variety of computing devices, including, but not limited to, a mobile computing device, a laptop computing device, a tablet computing device, or a desktop computing device. It will be appreciated that while system 100 is illustrated as comprising one server device 102, one third-party data source 104, and two client devices 106 and 108, any number of such elements may be used in other examples. Further, the functionality described herein with respect to server device 102, third-party data source 104, and client devices 106 and 108 may be distributed among or otherwise implemented on any number of different computing devices in any of a variety of other configurations in other examples.

Server device 102 is illustrated as comprising request processor 112, condition tree data store 114, static evaluation engine 116, and dynamic evaluation engine 118. In examples, request processor 112 communicates with third-party data source 104, client device 106, and/or client device 108. Request processor 112 may process requests associated with a condition tree data store according to aspects described herein. For example, request processor 112 may generate a website (e.g., which may be accessed by client device 106 and client device 108) with which to manage a user profile, provide user information or other context information (e.g., from context data store 120 or 122), and/or request or otherwise view the results of an eligibility evaluation based on a condition tree, among other examples. In other examples, request processor 118 provide an application programming interface (API) to perform such aspects as an alternative or in addition to a website. As another example, request processor 118 may parse or otherwise access information from third-party data source 104, which may be used to generate a condition tree according to aspects described herein. Thus, it will be appreciated that any of a variety of techniques may be used to communicate with server device 102.

Condition tree data store 114 stores one or more condition trees. Condition trees stored by condition tree data store 114 may be generated or otherwise received and stored using any of a variety of techniques. For example, a condition tree may be generated at least in part on input received from a user (e.g., via client device 106 or 108, as may be received by request processor 112) and/or parsing information from a data source such as third-party data source 104. As another example, at least a part of a condition tree may be provided or updated according to an API provided by request processor 112.

Static evaluation engine 116 evaluates a condition tree stored by condition tree data store 114 according to aspects described herein to generate an optimized condition tree. Static evaluation engine 116 evaluates the condition tree according to a set of static variables. For example, at least a part of the set of static variables may be provided by request processor 112 (e.g., as may be received from third-party data source 104 and/or client device 106 or 108 from context data store 120 or 122, respectively). Accordingly, static evaluation engine 116 evaluates the condition tree to identify one or more static subparts of the condition tree that are associated with static variables. In examples, the evaluation comprises generating a processing result for each of the identified static subparts. Static evaluation engine 116 may replace each identified static subpart with its associated processing result, thereby simplifying the condition tree to omit the static subpart in favor of the processing result may be used in place of the static subpart. By contrast, the condition tree may further comprise dynamic subparts that are unevaluated by static evaluation engine 116 and may instead be retained. As such, static evaluation engine 116 generates an optimized condition tree comprising one or more processing results (e.g., generated according to static subparts and associated static variables) and one or more dynamic subparts that were retained (e.g., as a result of their association with dynamic variables).

In examples, the optimized condition tree is stored in condition tree data store 114. In other examples, the optimized condition tree is retained in system memory, as it may be specific to the context for which it was generated. For example, a first user may have an associated first optimized condition tree, while a second user may have an associated second optimized condition tree. The first optimized condition tree and the second optimized condition tree may not be the same, as different static variables (e.g., which may be associated with each respective user) may have been used to generate each optimized condition tree. Thus, different optimized condition trees may be generated from the same source condition tree according to aspects of the present disclosure.

Dynamic evaluation engine 118 evaluates an optimized condition tree, as may have been generated by static evaluation engine 116. In examples, dynamic evaluation engine 118 evaluates the optimized condition tree according to a set of dynamic variables, as may have been received from request processor 112. For example, a user of client device 106 or 108 may have provided at least a part of the dynamic variables. As another example, request processor 112 may be processing a request associated with a set of evaluation results, such that the optimized condition tree is repeatedly evaluated according to at least one changing dynamic variable.

In order to evaluate an optimized condition tree, dynamic evaluation engine 118 evaluates processing results therein (e.g., as may have replaced one or more static subparts) and dynamic subparts of the optimized condition tree (e.g., according to a value set for set of dynamic variables) to generate an evaluation result. For example, a first value set may comprise a value for each of the dynamic variables, while a second value set may comprise at least one different value for the set of dynamic variables as compared to the first value set. The evaluation result may be provided to request processor 112 (e.g., for further processing or to be provided to client device 106 or 108).

In some instances, the processing described above with respect to static evaluation engine 116 and/or dynamic evaluation engine 118 further comprises evaluating a condition tree to identify a set of candidate variables that may negatively affect the evaluation. As used herein, a negative evaluation effect may yield an evaluation result that is different from an expected or preferred result. The evaluation may be performed in view of a set of fixed variables that cannot be changed. As discussed above, fixed variables are different from static and dynamic variables, where a fixed variable may be immutable or may be outside of the control of the user. Accordingly, the evaluation yields a set of candidate variables that may ultimately be changed (e.g., by a user or as a result of time passing) to cause the condition tree to output a different evaluation result. In some instances, the set of candidate variables is ranked according to the ease with which they are changed, such that variables that are easier to change are ranked higher than variables that are more difficult to change.

Client device 106 is illustrated as comprising context data store 120. As discussed above, client device 106 communicates with server device 102 in order to perform a condition tree evaluation according to aspects described herein. For example, a user of client device 106 may employ a web browser of client device 106 to communicate with request processor 112 of server device 102. As another example, a native application executed by client device 106 may be used to communicate with server device 102 accordingly (e.g., via an API or other protocol). Context data store 120 comprises one or more variables that may be included in the set of variables that are used to evaluate a condition tree. For example, context data store 120 stores static and/or dynamic variables associated with the user of client device 106. As another example, at least a part of the variables stored by context data store 120 may be communicated to and stored by server device 102 or, as another example, server device 102 may store variables (e.g., in a context data store of server device 102, as part of a session, and/or as part of a user profile) and associate them with the user of client device 106 accordingly.

Client device 108 comprises similar aspects to client device 106 and is therefore not necessarily re-described in detail. In some examples, rather than evaluating a condition tree at server device 102, client devices 106 and/or 108 may alternatively or additionally comprise a static evaluation engine and/or dynamic evaluation engine, such that at least a part of the processing described above may be performed local to client device 106 or 108. For example, server device 102 may generate an optimized condition tree using static evaluation engine 116, which may be provided to client device 106 or 108 such that the client device may evaluate a set of dynamic variables using a dynamic evaluation engine accordingly.

Figure 2A:
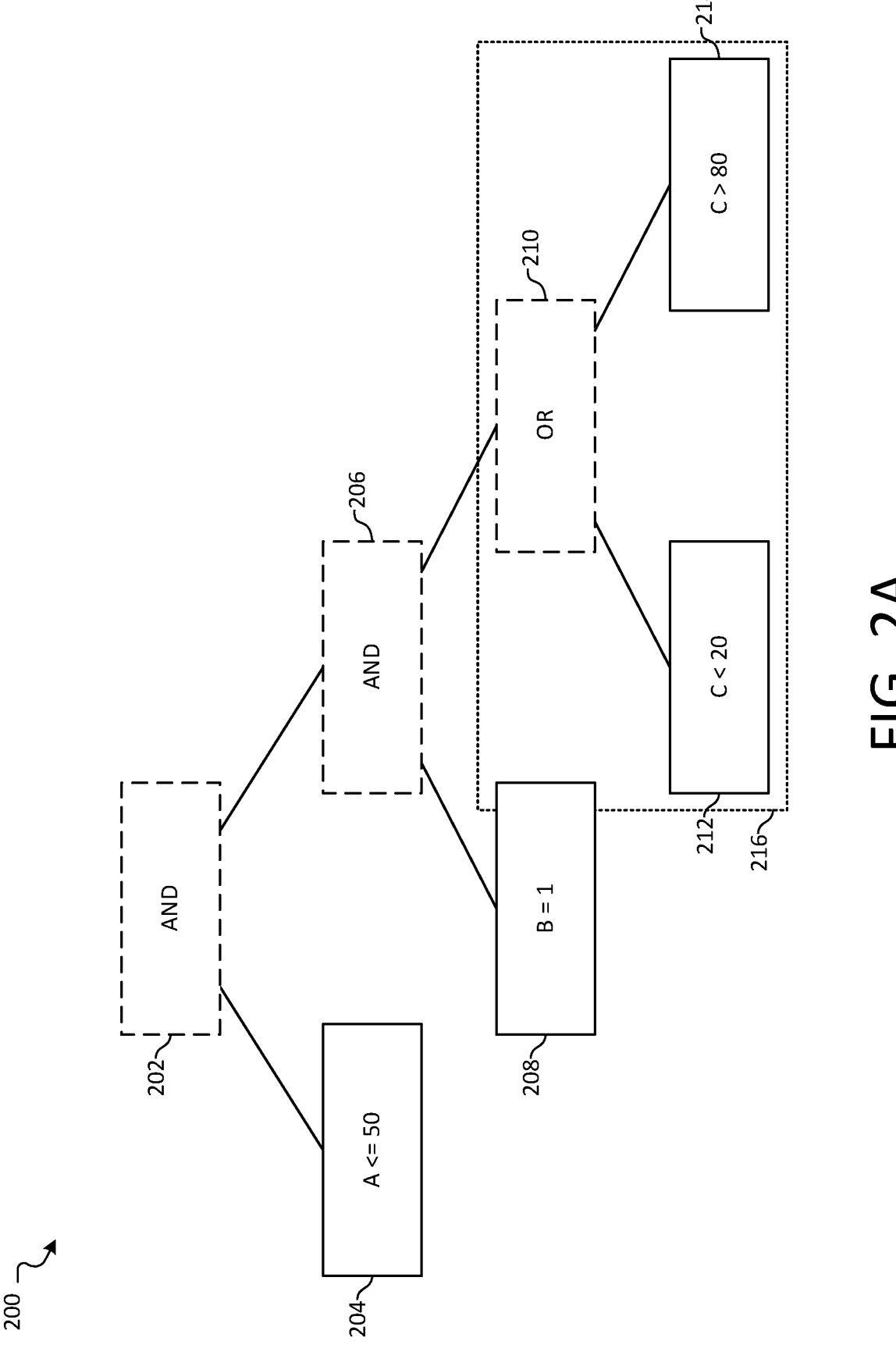
FIG. 2A illustrates an overview of an example condition tree.

FIG. 2A illustrates an overview of an example condition tree 200. As illustrated, condition tree 200 comprises operators 202, 206, and 210, which join rules 204, 208, 212, and 214. Operators 202, 206, and 210 are illustrated using dashed boxes to indicate that they are operators as compared to rules 204, 208, 212, and 214, which are illustrated using solid boxes. It will be appreciated that a condition tree may be represented in any of a variety of forms. For example, condition tree 200 may instead be represented as (A<=50 AND (B=1 AND (C<20 OR C>80))). Additionally, as discussed above, rules of a condition tree need not comprise solely mathematical operations. For example, a rule may comprise software instructions in addition to or as an alternative to such mathematical operations.

Condition tree 200 is comprised of numerous subparts. As illustrated, operator 210 and rules 212 and 214 may be considered a subpart. Another example subpart may comprise operators 206 and 210, in conjunction with rules 208, 212, and 214. As a further example, rule 204 may be a subpart. Thus, a subpart may comprise a single rule and, in some examples, an associated operator (e.g., a "not" operator), or may comprise two or more rules joined by a logical operator (e.g., an "and" operator or an "or" operator). Tree subpart 216 is highlighted in condition tree 200 using a dashed box and comprises rules 212 and 214, which are joined by operator 210.

Condition tree 200 evaluates a set of variables that, as illustrated, consists of variables A, B, and C. In an example, variable B may be a static variable having a value of "1," while variables A and C are dynamic variables. Accordingly, tree subpart 216 may be a dynamic subpart, as a result of C being a dynamic variable. By contrast, rule 208 may be termed a static subpart, as a result of variable B being a static variable. Thus, a static evaluation engine (e.g., static evaluation engine 116 in FIG. 1) may be used to evaluate the static subparts (e.g., rule 216) of condition tree 200 to generate an optimized condition tree based on one or more associated processing results accordingly.

Figure 2B:
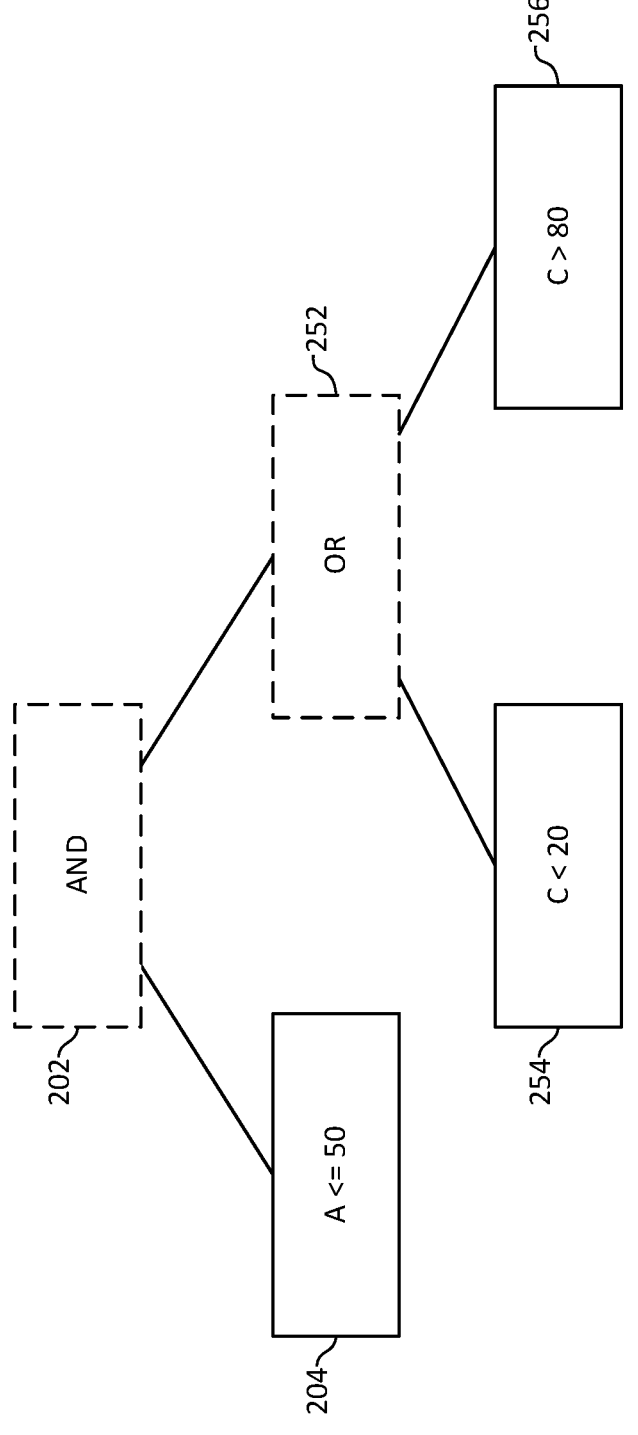
FIG. 2B illustrates an overview of an example optimized condition tree.

FIG. 2B illustrates an overview of an example optimized condition tree 250. As illustrated, rule 208 and associated operator 206 have been processed according to aspects described herein to generate optimized condition tree 250. As described above, variable B may have a value of "1," such that rule 208 evaluates to "true." As a result, operator 210 may be partially evaluated to determine that the processing result of operator 210 is dependent on the outcome of tree subpart 216 (given rule 208 evaluated to "true"). Accordingly, tree subpart 216 replaces operator 210 (and rule 208), thereby yielding optimized tree 250. Thus, tree subpart 216 in FIG. 2A replaces rule 208 and operator 210, as illustrated by rules 254 and 256, which are joined by operator 252.

Returning briefly to FIG. 2A, if operator 206 was instead an OR operator, the resulting optimized condition tree may comprise rule 204. Since rule 208 evaluates "true," any outcome of tree subpart 216 would have no effect on the evaluation result of condition tree 200, such that it may be omitted in the resulting optimized condition tree. Thus, in the above examples, evaluating the optimized condition tree omits or otherwise reduces at least the computational cost associated with rule 208 and operator 206. Further, in the instance where operator 206 is an OR operator, the computational cost associated with rules 212 and 214, as well as operator 210, is further omitted or reduced. The resulting optimized condition tree (e.g., optimized condition tree 250 in FIG. 2B) may then be evaluated by a dynamic evaluation engine (e.g., dynamic evaluation engine 118 in FIG. 1) using a set of dynamic variables.

Figure 3:
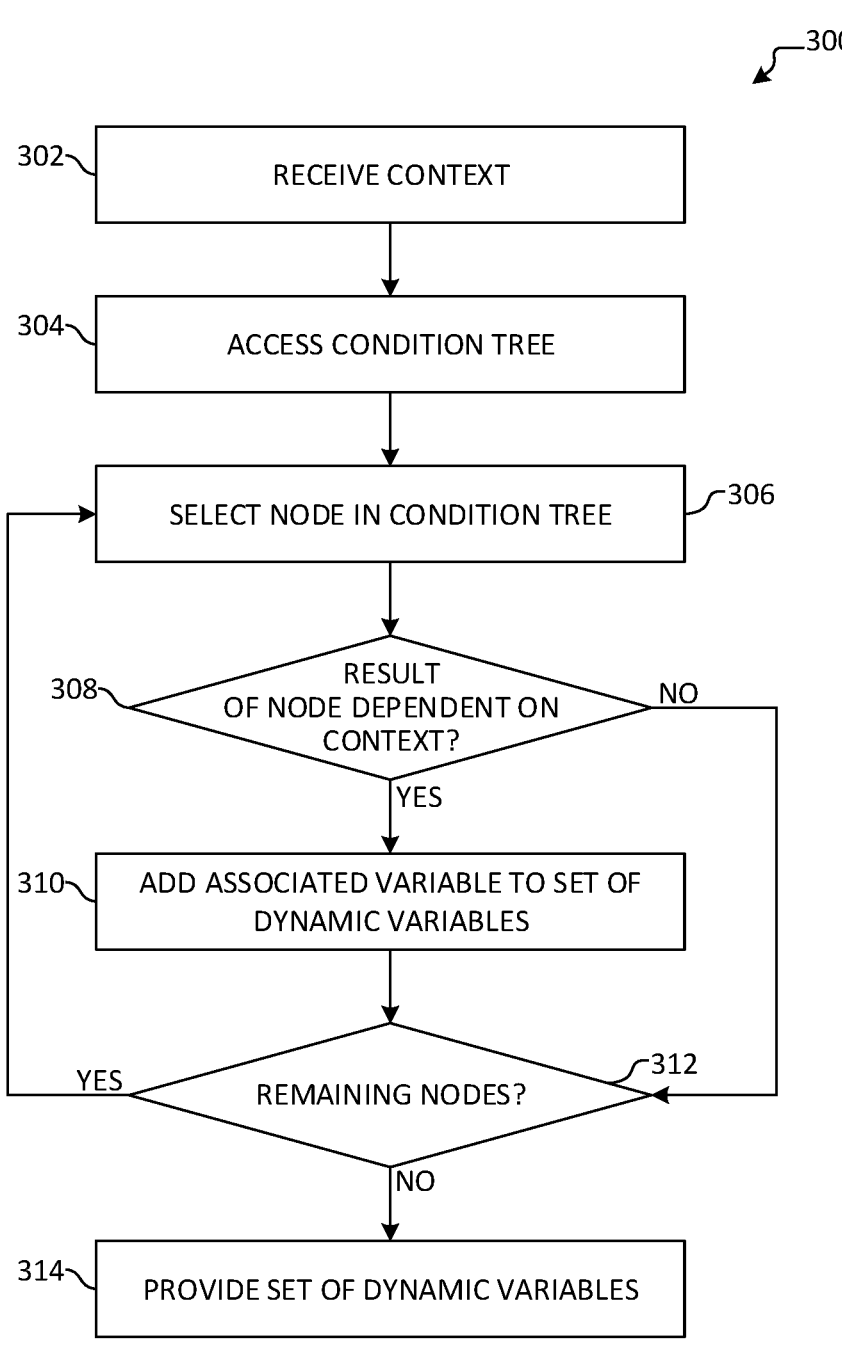
FIG. 3 illustrates an overview of an example method for preprocessing a condition tree to identify dynamic variables therein.

FIG. 3 illustrates an overview of an example method 300 for preprocessing a condition tree to identify dynamic variables therein. In examples, aspects of method 300 are performed by a static evaluation engine, such as static evaluation engine 116 in FIG. 1. For example, the static evaluation engine may preprocess a condition tree to determine which variables evaluated by a condition tree are static. The static evaluation engine may then perform the optimization techniques described herein according to the set of static variables generated by aspects of method 300. In other examples, the static evaluation engine may perform such processing contemporaneously with tree optimization.

Method 300 begins at operation 302, where a context is received. As described above, the context comprises or is otherwise associated with a set of variables. For example, the context may comprise variables from a user profile and/or from a context data store (e.g., context data store 120 or 122 in FIG. 1). As another example, one or more variables may be received from or provided by a client device, such as client device 106 or 108 in FIG. 1.

Flow progresses to operation 304, where a condition tree is accessed. In examples, the condition tree is accessed from a condition tree data store, such as condition tree data store 114 in FIG. 1. In some instances, the context may indicate a condition tree to access (e.g., relating to different financial instruments or eligibility evaluations). For example, a set of variables of the context may be associated with one or more condition trees.

At operation 306, a node in the condition tree is selected. In some instances, the condition tree may be evaluated according to a preordering or postordered depth-first search. For example, with reference to condition tree 200 in FIG. 2A, the node selected at operation 306 may be rule 204 according to a postordered depth-first search. As another example, the selection may be limited to operators of the condition tree (e.g., operators 202, 206, and 210 in FIG. 2A).

At determination 308, it is determined whether a processing result of the selected node is dependent on the context that was received at operation 302. In examples, the determination comprises evaluating one or more variables associated with the selected node. In examples where the selected node is an operator or is otherwise not a leaf of the condition tree, the evaluation may comprise evaluating one or more associated subparts of the condition tree associated with the selected nodes (e.g., rule 208 and tree subpart 216 that are associated with operator 206 in FIG. 2A). In some instances, such an evaluation may be performed recursively.

The determination may be performed according to exact or inexact matching techniques (e.g., based on variable name or a pattern associated with a variable name). As another example, the determination may comprise evaluating an associated subtree based on changed values for the set of variables in order to determine whether one or more variables affects the associated processing result. In some examples, a predetermined threshold may be used, such that a difference below the predetermined threshold or within a predetermined range is determined to not be dependent on the context. Thus, it will be appreciated that any of a variety of techniques may be used to determine whether the result of the selected node is dependent on the context.

If, at determination 308, it is determined that the result is dependent on the context, flow branches "YES" to operation 310, where one or more variables associated with the node are added to a set of dynamic variables. Flow then progresses to determination 312, which is discussed below.

If, however, it is determined at determination 308 that the result is not dependent on the context, flow instead branches "NO" to determination 312, where it is determined whether there are remaining nodes in the condition tree. In examples, the determination comprises determining whether there is another rule and/or logical operator of the condition tree that has not been processed according to method 300. Returning to the example where rule 204 of FIG. 2A was selected at operation 306, the determination may comprise determining that its parent (e.g., operator 202) or next rule node according to the depth-first search (e.g., rule 208) has not yet been processed.

Accordingly, if it is determined that there is a remaining node, flow branches "YES" to operation 306, such that flow may loop between operations 306, 308, 310, and 312 to process the condition tree while nodes remain to be processed. If, however, it is determined at determination 312 that there are no remaining nodes, flow instead branches "NO" to operation 314, where the generated set of dynamic variables is provided. As noted above, the set of dynamic variables may be provided for use by a static evaluation engine, such as static evaluation engine 116 of server device 102 in FIG. 1. Flow terminates at operation 314.

Figure 4A:
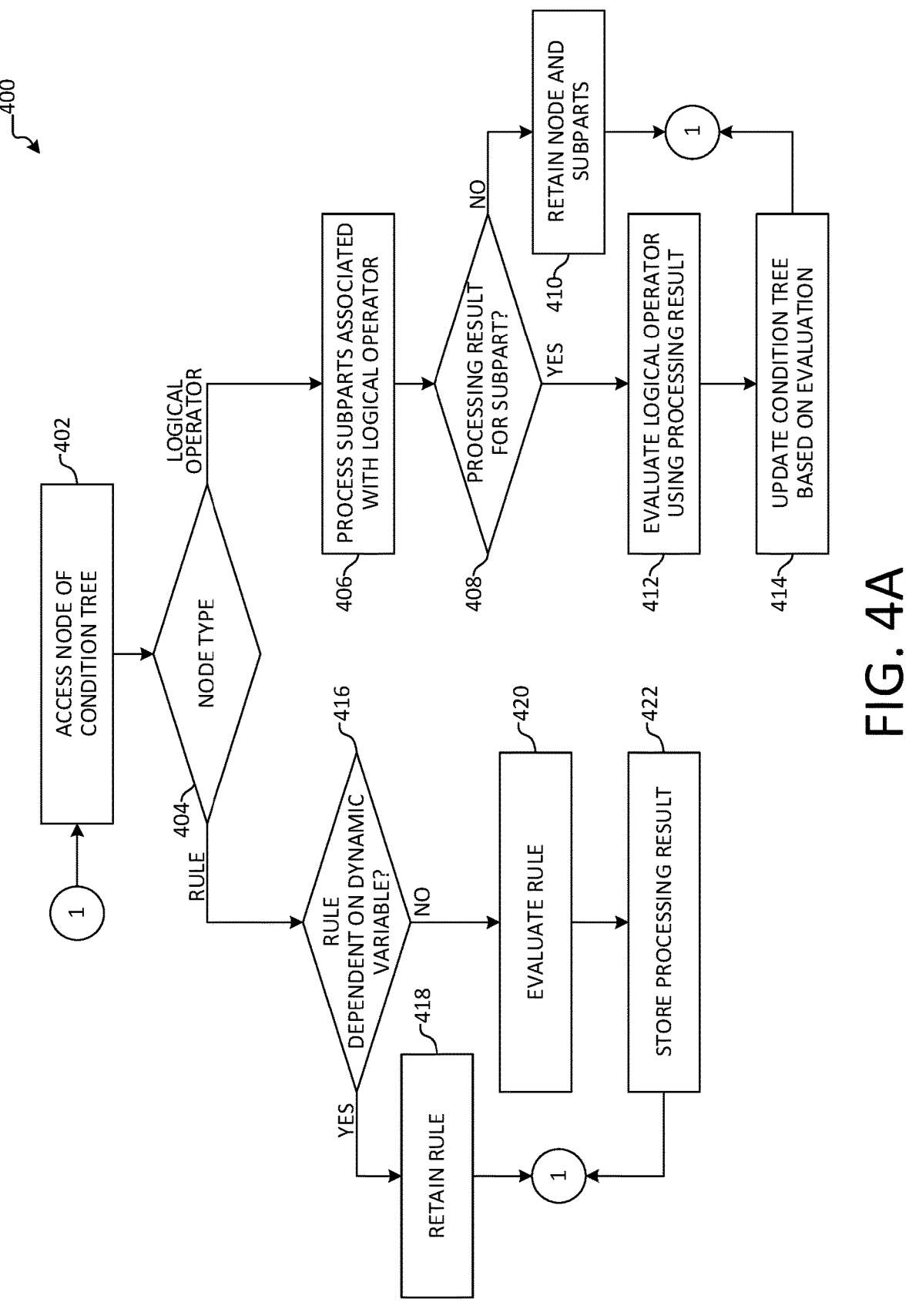
FIG. 4A illustrates an overview of an example method for optimizing a condition tree.

FIG. 4A illustrates an overview of an example method 400 for optimizing a condition tree. In examples, aspects of method 400 are performed by a static evaluation engine, such as static evaluation engine 116 of server device 102 in FIG. 1. Method 400 begins at operation 402, where a node of a condition tree is accessed. For example, nodes of the condition tree may be accessed according to a preordering or postordered depth-first search. For example, with reference to condition tree 200 in FIG. 2A, the node that is accessed at operation 402 may be rule 204 according to a postordered depth-first search. In such an example, nodes accessed in subsequent iterations of method 400 may be operator 202, followed by rule 208, followed by operator 206, etc.

Figure 2B:

At determination 404, a node type is determined for the node that was accessed at operation 402. According to aspects described herein, a node of a condition tree may be a rule (e.g., rules 204, 208, 212, and 214 in FIG. 2) or an operator (e.g., operators 202, 206, and 210). Thus, if the accessed node is a logical operator, flow branches "LOGICAL OPERATOR" to operation 406, where one or more tree subparts associated with the logical operator are processed. For example, if the logical operator accessed at operation 402 is a "not" operator, there may be one tree subpart to process. As another example, if the logical operator is an "or" or an "and" operator, there may be a plurality of subtrees to process. In examples, operation 406 comprises performing aspects of method 400 for each subpart associated with the logical operator (e.g., similar to operations 406-414 for operators and operations 416-422 for rules therein). Such aspects may be performed recursively or iteratively.

At determination 408, it is determined whether there is a processing result for a subpart associated with the logical operator. Returning to the example of condition tree 200 in FIG. 2A, evaluating the subpart comprising rule 208, operator 206, and tree subpart 216, yields a processing result for rule 208 (e.g., when variable B is a static variable), while tree subpart 216 may not yield a processing result (e.g., when variable C is a dynamic variable). Accordingly, it may be determined at determination 408 that there is a processing result for at least one subpart associated with the operator (e.g., rule 208 of operator 206 in FIG. 2A).

If, at determination 408, it is determined that there is not a processing result for any subparts associated with the logical operator, flow branches "NO" to operation 410, where the node (e.g., as was accessed at operation 402) and its associated subparts are retained in the condition tree. This may be the case in instances where one or more dynamic variables are associated with generating a processing result for the node and its associated subparts (e.g., as will be discussed below with respect to the "RULE" branch of method 400). While operation 410 is described as being performed in a context where there is not a processing result for any subparts associated with the logical operator node, it will be appreciated that, in other examples, operation 410 may be performed in instances where less than all subparts have an associated processing result or based on any of a variety of other thresholds. Flow then returns to operation 402, where another node of the condition tree may be processed.

If, however, it is determined at determination 408 that there is a processing result for a subpart associated with the logical operator node, flow instead branches "YES" to operation 412, where the logical operator is evaluated using the processing result. In instances where a processing result was generated for every subpart associated with the logical operator, it may be possible to completely evaluate the logical operator. In other instances, for example when only a subset of the subparts have an associated processing result, it may instead be possible to simplify the logical operator node and its associated subparts within the condition tree.

For example, if at least one subpart associated with an "and" operator evaluated to "true," such subparts may be omitted from the condition tree. Similarly, if a subpart associated with an "or" operator evaluated to "false," the subpart may be omitted from the condition tree. In instances where one subpart remains after performing such an evaluation, the subpart itself may replace the logical operator in the condition tree (e.g., similar to optimized condition tree 250 in FIG. 2B, where rules 254 and operator 252 replace rule 208 and operator 206 of condition tree 200 in FIG. 2A). As another example, if a subpart associated with an "and" operator evaluated to "false," a "false" processing result may be determined for the operator without evaluating other subparts associated with the operator Similarly, if a subpart associated with an "or" operator evaluated to "true," as "true" processing result may be determined for the operator without evaluating other subparts associated with the operator.

At operation 414, the condition tree is updated based on the evaluation performed at operation 412. For example, if a processing result is determined for the logical operator itself (e.g., a "true" or a "false" result based on a complete set of processing results for the associated subtrees), the condition tree is updated to comprise a result node in place of the logical operator and its associated tree subparts. The result node may be temporary, as the result node may be further simplified as a result of an evaluation of a parent node of the condition tree. As described above, if only a subset of the associated subparts yielded a processing result, one or more subparts may be omitted from the condition tree. In another example, the condition node may be replaced by an associated subpart, as may be the case when the associated subpart is the only remaining subpart left to evaluate (e.g., by a dynamic evaluation engine, in instances where the operator was an "and" with other subparts that evaluated "true" or the operator was an "or" with other subparts that evaluated "false"). Flow then returns to operation 402, where another node of the condition tree may be processed.

Returning to determination 404, if it is instead determined that the node is a rule node, flow instead branches "RULE" to determination 416, where it is determined whether the rule is dependent on a dynamic variable. In examples, the determination comprises evaluating one or more variables associated with the selected node. The determination may be performed according to exact or inexact matching techniques (e.g., based on variable name or a pattern associated with a variable name). As another example, a set of dynamic variables (e.g., as may be generated according to method 300 in FIG. 3) may be evaluated to determine whether the rule is dependent on a dynamic variable therein. Thus, it will be appreciated that any of a variety of techniques may be used to determine whether the result of the selected node is dependent on the context.

If, at determination 416, it is determined that the rule is dependent on a dynamic variable, flow branches "YES" to operation 418, where the rule is retained in the condition tree. If, however, it is determined that the rule is not dependent on a dynamic variable, flow instead branches "NO" to operation 420, where the rule is evaluated to generate a processing result. For example, operation 420 may comprise accessing a static variable (e.g., from a set of variables associated with a context such as a user profile or from a client device) and evaluating the static variable based on a mathematical operator. It will be appreciated that, in other examples, the rule may comprise software instructions in addition to or as an alternative to such mathematical operations.

At operation 422 the processing result is stored. For example, the rule may be replaced by the processing result within the condition tree. Accordingly, determination 408 above may determine that a processing result was generated for the tree subpart (e.g., for the rule node that was accessed at operation 402 and evaluated at operation 420). In other examples, the processing result may be provided as a return value as part of a recursive evaluation of the condition tree. Flow then returns to operation 402, where another node of the condition tree is evaluated. Thus, execution of method 400 continues until there are no remaining nodes of the condition tree to process, at which point an optimized condition tree has been generated. As noted above, the resulting optimized condition tree comprises processing results (e.g., as may have been generated by operations 412, 414, 420, and 422) and dynamic subparts (e.g., as may have been retained by operations 410 and 418).

Figure 4B:
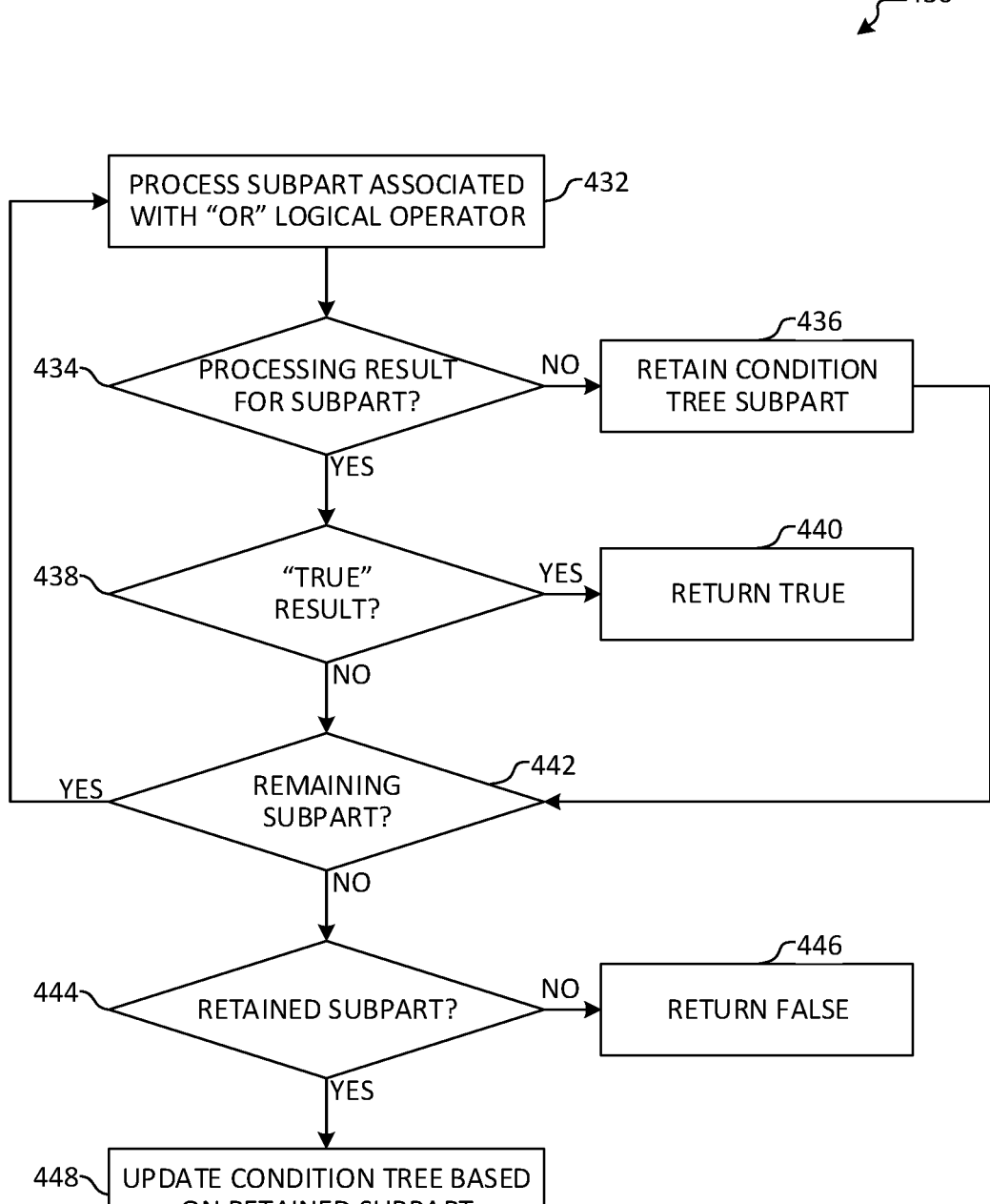
FIG. 4B illustrates an overview of an example method for optimizing an "or" operation of a condition tree.

FIG. 4B illustrates an overview of an example method 430 for optimizing an "or" operation of a condition tree. Aspects of method 430 may be performed as part of operations 406-414 discussed above with respect to method 400 in FIG. 4A. In examples, aspects of method 430 are performed by a static evaluation engine, such as static evaluation engine 116 of server device 102 in FIG. 1.

Method 430 begins at operation 432, where a subpart associated with an "or" logical operator is processed. As discussed above, the subpart may comprise a rule or another operator with one or more associated rules. For example, "or" operator 210 of condition tree 200 in FIG. 2A is associated with two subparts: rule 212 and rule 214. Accordingly, rule 212 and rule 214 may each be evaluated at operation 432 (e.g., rule 212 at the first iteration of operation 432 and rule 214 at the second iteration of operation 432, as a result of determining there is a remaining subpart at determination 442). In examples, operation 432 comprises performing aspects similar to those of method 400 for the subpart (e.g., similar to operations 406-414 for operators and operations 416-422 for rules therein). Such aspects may be performed recursively or iteratively.

At determination 434, it is determined whether there is a processing result for the subpart. As described above, in instances where the subpart is not dependent on a dynamic variable, a processing result may be generated for the subpart accordingly. By contrast, if the subpart is dependent on one or more dynamic variables, a processing result may not be generated for the subpart, such that the dynamic subpart can be evaluated at a later time (e.g., by a dynamic evaluation engine, such as dynamic evaluation engine 118 in FIG. 1).

If, at determination 434, it is determined that a processing result was not generated for the subpart, flow branches "NO" to operation 436, where the condition tree subpart is retained. For example, the "or" logical operator retains the dynamic subpart, such that a subsequent evaluation of the condition tree may be determined according to one or more dynamic variables on which the subpart and, by extension, the logical "or" operator depend. Flow then progresses to determination 442, which is discussed below.

However, if it is instead determined at determination 434 that there is a processing result for the subpart, flow branches "YES" to determination 438, where it is determined whether the condition tree subpart evaluated to "true." Since method 430 is a method for evaluating an "or" operator, a "true" evaluation result indicates that the evaluation result for the logical operator and its associated subparts will be "true," regardless of the evaluation result for other associated subparts. Accordingly, if the processing result generated at operation 432 is "true," flow branches "YES" to operation 440 where a "true" processing result is returned for the "or" logical operator. In some examples, operation 440 comprises updating the condition tree to comprise the "true" processing result and to further omit the logical operator and its associated subtrees from the condition tree. Method 430 terminates at operation 440.

If it is instead determined that the evaluation result is not a "true" result, flow instead branches "NO" to determination 442, where it is determined whether there is a remaining condition tree subpart associated with the logical "or" operator. Returning to the example of "or" operator 210 in FIG. 2A, the determination may comprise determining that "or" operator 210 is further associated with rule 214 in addition to rule 212, which was just evaluated as discussed above. Accordingly, if there is a remaining subpart to process, flow branches "YES" to operation 432, where the remaining subpart is processed. Thus, flow loops between operations 432-442 to evaluate remaining subparts associated with the logical operator, unless one of the subparts evaluates "true," in which case flow terminates at operation 440.

If, however, there are no remaining subparts (and none of the subparts evaluated to "true" at determination 438), flow eventually branches "NO" to determination 444, where it is determined whether any subparts were retained (e.g., by operation 436). For example, one or more subparts associated with the "or" logical operator may be dependent on a dynamic variable, such that an evaluation result was not determined for the subpart. If no subparts were retained (e.g., all subparts associated with the operator were evaluated) and no subparts evaluated "true" (e.g., such that flow branched at determination 438 to operation 440), flow branches "NO" to operation 446, where a "false" processing result is returned for the "or" logical operator. In some examples, operation 446 comprises updating the condition tree to comprise the "false" processing result and to further omit the logical operator and its associated subtrees from the condition tree. Method 430 terminates at operation 446.

By contrast, if it is determined at determination 444 that a condition tree subpart was retained, flow instead branches "YES" to operation 448 where the condition tree is updated based on the retained subpart. For example, if only a subset of the associated subparts yielded a processing result, one or more subparts may be omitted from the condition tree. In another example, the condition node may be replaced by an associated subpart, as may be the case when the associated subpart is the only remaining subpart left to evaluate (e.g., by a dynamic evaluation engine, in instances where other subparts that evaluated "false"). Method 430 terminates at operation 448.

Figure 4C:
FIG. 4C illustrates an overview of an example method for optimizing an "and" operation of a condition tree.

FIG. 4C illustrates an overview of an example method 460 for optimizing an "and" operation of a condition tree. Aspects of method 460 may be performed as part of operations 406-414 discussed above with respect to method 400 in FIG. 4A. In examples, aspects of method 460 are performed by a static evaluation engine, such as static evaluation engine 116 of server device 102 in FIG. 1.

Method 460 begins at operation 462, where a subpart associated with an "and" logical operator is processed. As discussed above, the subpart may comprise a rule or another operator with one or more associated rules. For example, "and" operator 206 of condition tree 200 in FIG. 2A is associated with two subparts: rule 208 and operator 210 and its associated rules 212 and 214, which may be referred to as tree subpart 216. Accordingly, rule 208 and tree subpart 216 may each be evaluated at operation 462 (e.g., rule 208 at the first iteration of operation 462 and tree subpart 216 at the second iteration of operation 462, as a result of determining there is a remaining subpart at determination 472). In examples, operation 462 comprises performing aspects similar to those of method 400 for the subpart (e.g., similar to operations 406-414 for operators and operations 416-422 for rules therein). Such aspects may be performed recursively or iteratively.

At determination 464, it is determined whether there is a processing result for the subpart. As described above, in instances where the subpart is not dependent on a dynamic variable, a processing result may be generated for the subpart accordingly. By contrast, if the subpart is dependent on one or more dynamic variables, a processing result may not be generated for the subpart, such that the dynamic subpart can be evaluated at a later time (e.g., by a dynamic evaluation engine, such as dynamic evaluation engine 118 in FIG. 1).

If, at determination 464, it is determined that a processing result was not generated for the subpart, flow branches "NO" to operation 436, where the condition tree subpart is retained. For example, the "or" logical operator retains the dynamic subpart, such that a subsequent evaluation of the condition tree may be determined according to one or more dynamic variables on which the subpart and, by extension, the logical "or" operator depend. Flow then progresses to determination 472, which is discussed below.

However, if it is instead determined at determination 464 that there is a processing result for the subpart, flow branches "YES" to determination 468, where it is determined whether the condition tree subpart evaluated to "false." Since method 460 is a method for evaluating an "and" operator, a "false" evaluation result indicates that the evaluation result for the logical operator and its associated subparts will be "false," regardless of the evaluation result for other associated subparts. Accordingly, if the processing result generated at operation 462 is "false," flow branches "YES" to operation 470 where a "false" processing result is returned for the "and" logical operator. In some examples, operation 470 comprises updating the condition tree to comprise the "false" processing result and to further omit the logical operator and its associated subtrees from the condition tree. Method 460 terminates at operation 470.

If it is instead determined that the evaluation result is not a "false" result, flow instead branches "NO" to determination 472, where it is determined whether there is a remaining condition tree subpart associated with the logical "and"

operator. Returning to the example of "and" operator 206 in FIG. 2A, the determination may comprise determining that "and" operator 206 is further associated with tree subpart 216 in addition to rule 208, which was just evaluated as discussed above. Accordingly, if there is a remaining subpart to process, flow branches "YES" to operation 462, where the remaining subpart is processed. Thus, flow loops between operations 462-472 to evaluate remaining subparts associated with the logical operator, unless one of the subparts evaluates "false," in which case flow terminates at operation 470.

If, however, there are no remaining subparts (and none of the subparts evaluated to "false" at determination 468), flow eventually branches "NO" to determination 474, where it is determined whether any subparts were retained (e.g., by operation 466). For example, one or more subparts associated with the "and" logical operator may be dependent on a dynamic variable, such that an evaluation result was not determined for the subpart. If no subparts were retained (e.g., all subparts associated with the operator were evaluated) and no subparts evaluated "false" (e.g., such that flow branched at determination 468 to operation 470), flow branches "NO" to operation 476, where a "true" processing result is returned for the "and" logical operator. In some examples, operation 476 comprises updating the condition tree to comprise the "true" processing result and to further omit the logical operator and its associated subtrees from the condition tree. Method 460 terminates at operation 476.

By contrast, if it is determined at operation 474 that a condition tree subpart was retained, flow instead branches "YES" to operation 478 where the condition tree is updated based on the retained subpart. For example, if only a subset of the associated subparts yielded a processing result, one or more subparts may be omitted from the condition tree. In another example, the condition node may be replaced by an associated subpart, as may be the case when the associated subpart is the only remaining subpart left to evaluate (e.g., by a dynamic evaluation engine, in instances where other subparts evaluated to "true"). Method 460 terminates at operation 478.

Figure 4D:
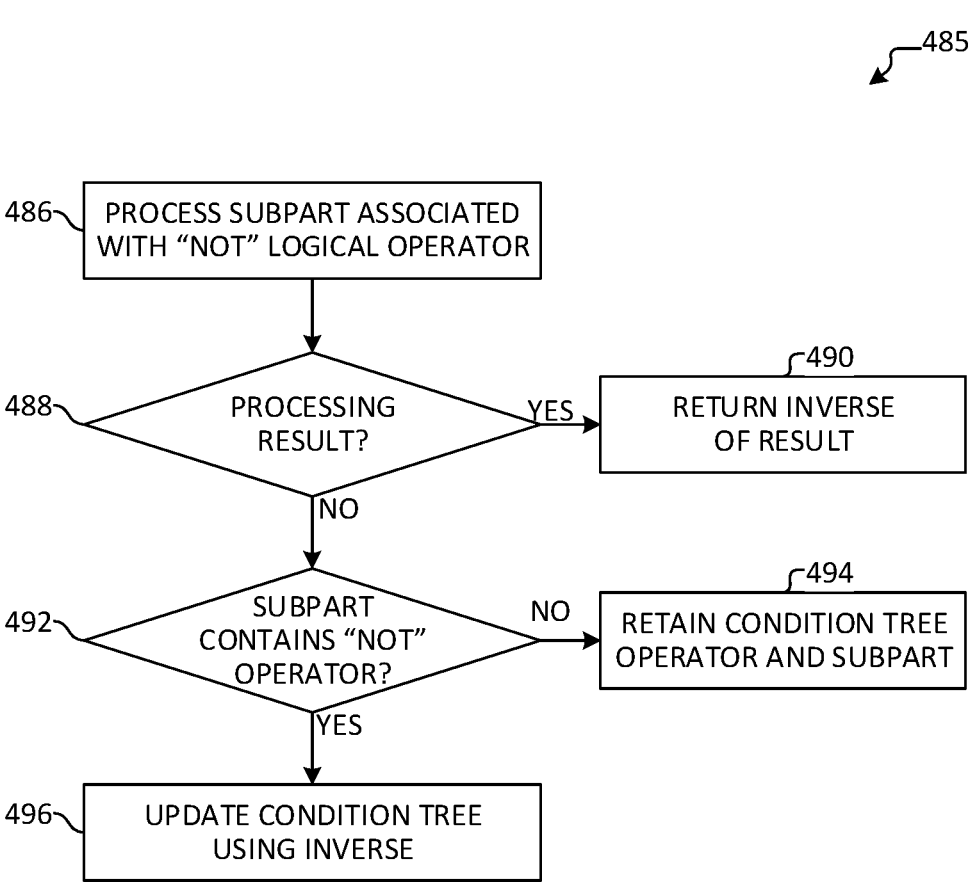
FIG. 4D illustrates an overview of an example method for optimizing a "not" operation of a condition tree.

FIG. 4D illustrates an overview of an example method 485 for optimizing a "not" operation of a condition tree. Aspects of method 485 may be performed as part of operations 406-414 discussed above with respect to method 400 in FIG. 4A. In examples, aspects of method 485 are performed by a static evaluation engine, such as static evaluation engine 116 of server device 102 in FIG. 1.

Method 485 begins at operation 486, where a subpart associated with a "not" logical operator is processed. As discussed above, the subpart may comprise a rule or another operator with one or more associated rules. In examples, operation 486 comprises performing aspects similar to those of method 400 for the subpart (e.g., similar to operations 406-414 for operators and operations 416-422 for rules therein). Such aspects may be performed recursively or iteratively.

At determination 488, it is determined whether there is a processing result for the subpart. As described above, in instances where the subpart is not dependent on a dynamic variable, a processing result may be generated for the subpart accordingly. By contrast, if the subpart is dependent on one or more dynamic variables, a processing result may not be generated for the subpart, such that the dynamic subpart can be evaluated at a later time (e.g., by a dynamic evaluation engine, such as dynamic evaluation engine 118 in FIG. 1).

If, at determination 488, it is determined that a processing result was generated for the subpart, flow branches "YES" to operation 490, where the inverse of the processing result is returned. In some examples, operation 490 comprises updating the condition tree to comprise the inverse of the processing result and to further omit the logical operator and its associated subtree from the condition tree. Method 485 terminates at operation 490.

However, if it is instead determined at determination 488 that there is not a processing result for the subpart, flow branches "NO" to determination 492, where it is determined whether the subpart comprises another "not" operator. Since method 485 is a method for evaluating a "not" operator, two "not" operator nodes (e.g., directly connected in the condition tree such as by a parent/child relationship) would effectively yield the same processing result as a condition tree in which both "not" operator nodes were omitted.

Accordingly, if the condition tree subpart does not contain a "not" operator, flow branches "NO" to operation 494, where the operator and associated subpart are retained within the condition tree. Flow terminates at operation 494. If, however, the subpart contains a "not" operator, flow instead branches "YES" to operation 496, where the condition tree is updated to omit the "not" logical operator that was processed at operation 486 and the not operator in the subpart, thereby omitting both not operators and simplifying the condition tree accordingly. Flow terminates at operation 496.

Figure 5A:
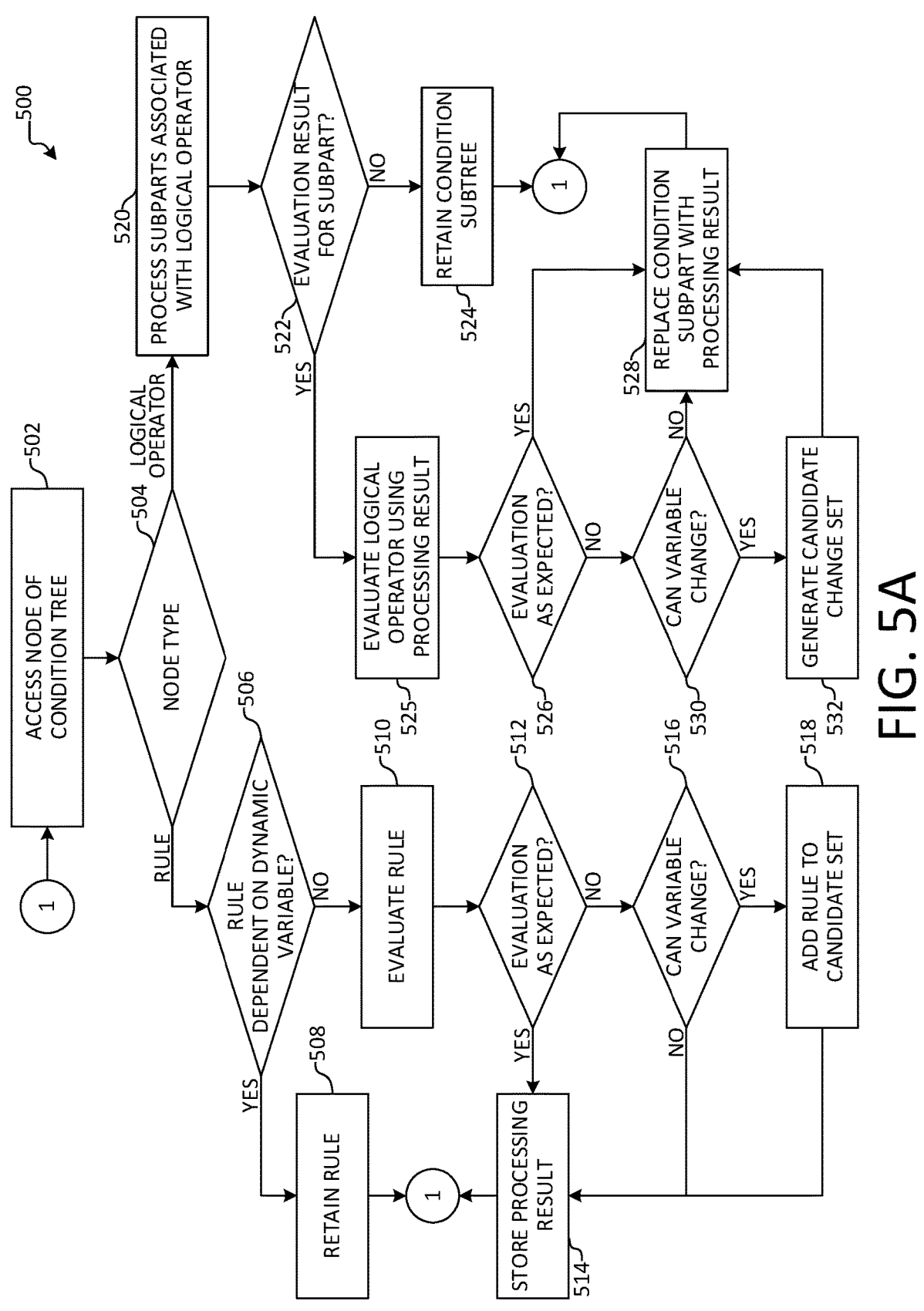
FIG. 5A illustrates an overview of an example method for processing an optimized condition tree to identify variables that affect the evaluation of the condition tree.

FIG. 5A illustrates an overview of an example method 500 for processing an optimized condition tree to identify variables that affect the evaluation of the condition tree. In examples, aspects of method 500 are performed by a static evaluation engine and/or a dynamic evaluation engine, such as static evaluation engine 116 or dynamic evaluation engine 118 of server device 102 in FIG. 1.

Method 500 begins at operation 502, where a node of a condition tree is accessed. For example, nodes of the condition tree may be accessed according to a preordering or postordered depth-first search. For example, with reference to condition tree 200 in FIG. 2A, the node that is accessed at operation 502 may be rule 204 according to a postordered depth-first search. In such an example, nodes accessed in subsequent iterations of method 500 may be operator 202, followed by rule 208, followed by operator 206, etc.

At determination 504, a node type is determined for the node that was accessed at operation 502. According to aspects described herein, a node of a condition tree may be a rule (e.g., rules 204, 208, 212, and 214 in FIG. 2) or an operator (e.g., operators 202, 206, and 210). Thus, if the accessed node is a rule, flow branches "RULE" to determination 506, where it is determined whether the rule is dependent on a dynamic variable. In examples, the determination comprises evaluating one or more variables associated with the selected node. The determination may be performed according to exact or inexact matching techniques (e.g., based on variable name or a pattern associated with a variable name). As another example, a set of dynamic variables (e.g., as may be generated according to method 300 in FIG. 3) may be evaluated to determine whether the rule is dependent on a dynamic variable therein. Thus, it will be appreciated that any of a variety of techniques may be used to determine whether the result of the selected node is dependent on the context.

If, at determination 506, it is determined that the rule is dependent on a dynamic variable, flow branches "YES" to operation 508, where the rule is retained in the condition tree. If, however, it is determined that the rule is not dependent on a dynamic variable, flow instead branches "NO" to operation 510, where the rule is evaluated to generate a processing result. For example, operation 510 may comprise accessing a static variable (e.g., from a set of variables associated with a context such as a user profile or from a client device) and evaluating the static variable based on a mathematical operator. It will be appreciated that, in other examples, the rule may comprise software instructions in addition to or as an alternative to such mathematical operations.

At determination 512, it is determined whether the processing result generated at operation 510 is as expected or preferred. As discussed above, one or more processing results may ultimately cause a condition tree to yield a negative evaluation result. Accordingly, aspects of method 500 may identify rules associated with a negative evaluation result, such that associated variables may be changed in order to yield a positive evaluation result instead. In some examples, the determination comprises evaluating an indication as to a preferred processing result, which may be compared to the processing result that was generated at operation 510.

For example, the preferred processing result may be an indication as to the preferred result for the node that was accessed at operation 502 or may be an indication as to a preferred evaluation result for the condition tree as a whole, which may be processed in view of associated nodes. As an example, a preferred processing result may indicate that the condition tree as a whole should evaluate "true," such that the effect of the processing result generated at operation 510 on the overall evaluation result may be determined. Returning to example condition tree 200 in FIG. 2A, if operation 510 evaluated rule 208 and the overall evaluation result for the condition tree is "true," it may be determined that the preferred processing result for rule 208 is similarly "true," as a "false" processing result would cause condition tree 200 to evaluate "false."

Accordingly, if, at determination 512 it is determined that the evaluation is as expected, flow branches "YES" to operation 514, where the processing result is stored. For example, the rule may be replaced by the processing result within the condition tree. In other examples, the processing result may be provided as a return value as part of a recursive evaluation of the condition tree. Flow then returns to operation 502, where another node of the condition tree is evaluated. Thus, execution of method 500 continues until there are no remaining nodes of the condition tree to process, at which point an optimized condition tree has been generated. For example, the resulting optimized condition tree comprises processing results (e.g., as may have been generated by operations 510 and 514) and dynamic subparts (e.g., as may have been retained by operation 508).

If, however, it is instead determined at operation 512 that the evaluation is not as expected, flow branches "NO" to determination 516, where it is determined whether a variable associated with the processing result can change. In examples, the evaluation at operation 510 may be performed in view of a set of fixed variables that cannot be changed. Accordingly, the determination may comprise determining whether variables associated with the rule are in a set of fixed variables. If it is determined that variables of the rule cannot change, flow branches "NO" to operation 514, which was discussed above.

However, if it is instead determined that one or more variables associated with the rule can change, flow instead branches "YES" to operation 518, where the rule is added to a candidate set. In examples, the candidate set comprises a set of rules and/or variables that may be changed in order to yield a different rule processing result and/or a different model evaluation result. Thus, the rule may be added, a reference to the rule may be added, and/or one or more variables may be added. Flow progresses to operation 514, which was discussed above.

Returning to determination 504, if it is instead determined that the accessed node is a logical operator, flow branches "LOGICAL OPERATOR" to operation 520, where one or more tree subparts associated with the logical operator are processed. For example, if the logical operator accessed at operation 502 is a "not" operator, there may be one tree subpart to process. As another example, if the logical operator is an "or" or an "and" operator, there may be a plurality of subtrees to process. In examples, operation 520 comprises performing aspects of method 500 for each subpart associated with the logical operator (e.g., similar to operations 506-518 for rules and operations 520-532 for operators associated therewith). Such aspects may be performed recursively or iteratively.

At determination 522, it is determined whether there is a processing result for a subpart associated with the logical operator. Returning to the example of condition tree 200 in FIG. 2A, evaluating the subpart comprising rule 208, operator 206, and tree subpart 216, yields a processing result for rule 208 (e.g., when variable B is a static variable), while tree subpart 216 may not yield a processing result (e.g., when variable C is a dynamic variable). Accordingly, it may be determined at determination 522 that there is a processing result for at least one subpart associated with the operator (e.g., rule 208 of operator 206 in FIG. 2A).

If, at determination 522, it is determined that there is not a processing result for any subparts associated with the logical operator, flow branches "NO" to operation 524, where the node (e.g., as was accessed at operation 502) and its associated subparts are retained in the condition tree. This may be the case in instances where one or more dynamic variables are associated with generating a processing result for the node and its associated subparts (e.g., as a result of retaining a rule by operation 508 discussed above). While operation 524 is described as being performed in a context where there is not a processing result for any subparts associated with the logical operator node, it will be appreciated that, in other examples, operation 524 may be performed in instances where less than all subparts have an associated processing result or based on any of a variety of other thresholds. Flow then returns to operation 502, where another node of the condition tree may be processed.

If, however, it is determined at determination 522 that there is a processing result for a subpart associated with the logical operator node, flow instead branches "YES" to operation 525, where the logical operator is evaluated using the processing result. In instances where a processing result was generated for every subpart associated with the logical operator, it may be possible to completely evaluate the logical operator. In other instances, for example when only a subset of the subparts have an associated processing result, it may instead be possible to simplify the logical operator node and its associated subparts within the condition tree.

For example, if at least one subpart associated with an "and" operator evaluated to "true," such subparts may be omitted from the condition tree. Similarly, if a subpart associated with an "or" operator evaluated to "false," the subpart may be omitted from the condition tree. In instances where one subpart remains after performing such an evaluation, the subpart itself may replace the logical operator in the condition tree (e.g., similar to optimized condition tree

250 in FIG. 2B, where rules 254 and operator 252 replace rule 208 and operator 206 of condition tree 200 in FIG. 2A). As another example, if a subpart associated with an "and" operator evaluated to "false," a "false" processing result may be determined for the operator without evaluating other subparts associated with the operator Similarly, if a subpart associated with an "or" operator evaluated to "true," as "true" processing result may be determined for the operator without evaluating other subparts associated with the operator.

Flow progresses to determination 526, where it is determined whether the evaluation at operation 525 is as expected or preferred. Similar to determination 512, one or more processing results may ultimately cause a condition tree to yield a negative evaluation result. Accordingly, aspects of method 500 may identify rules associated with a negative evaluation result, such that associated variables may be changed in order to yield a positive evaluation result instead. In some examples, the determination comprises evaluating an indication as to a preferred processing result, which may be compared to the processing result that was generated at operation 525.

Accordingly, if, at determination 526 it is determined that the evaluation is as expected, flow branches "YES" to operation 528, where the condition tree is updated based on the evaluation performed at operation 525. For example, if a processing result is determined for the logical operator itself (e.g., a "true" or a "false" result based on a complete set of processing results for the associated subtrees), the condition tree is updated to comprise a result node in place of the logical operator and its associated tree subparts. The result node may be temporary, as the result node may be further simplified as a result of an evaluation of a parent node of the condition tree. As described above, if only a subset of the associated subparts yielded a processing result, one or more subparts may be omitted from the condition tree. In another example, the condition node may be replaced by an associated subpart, as may be the case when the associated subpart is the only remaining subpart left to evaluate (e.g., by a dynamic evaluation engine, in instances where the operator was an "and" with other subparts that evaluated "true" or the operator was an "or" with other subparts that evaluated "false").

Flow then returns to operation 502, where another node of the condition tree may be processed. Thus, execution of method 500 continues until there are no remaining nodes of the condition tree to process, at which point an optimized condition tree has been generated. For example, the resulting optimized condition tree comprises processing results (e.g., as may have been generated by operations 510, 514, 525, and 528) and dynamic subparts (e.g., as may have been retained by operations 508 and 524).

If, however, it is instead determined at operation 526 that the evaluation is not as expected, flow branches "NO" to determination 530, where it is determined whether a variable associated with the processing result can change. In examples, the evaluation at operation 525 may be performed in view of a set of fixed variables that cannot be changed. Accordingly, the determination may comprise determining whether variables associated with the logical operator (and one or more subparts) are in a set of fixed variables. If it is determined that variables of the rule cannot change, flow branches "NO" to operation 528, which was discussed above.

However, if it is instead determined that one or more variables associated with the rule can change, flow instead branches "YES" to operation 532, where the logical operator and/or one or more subparts are added to a candidate set. In examples, the candidate set comprises a set of nodes and/or associated variables that may be changed in order to yield a different rule processing result and/or a different model evaluation result. In some instances, operation 532 comprises aggregating condition sets associated with subtrees that were processed at operation 520 (e.g., as may have been generated at operation 518). Flow progresses to operation 514, which was discussed above.

Figure 5B:
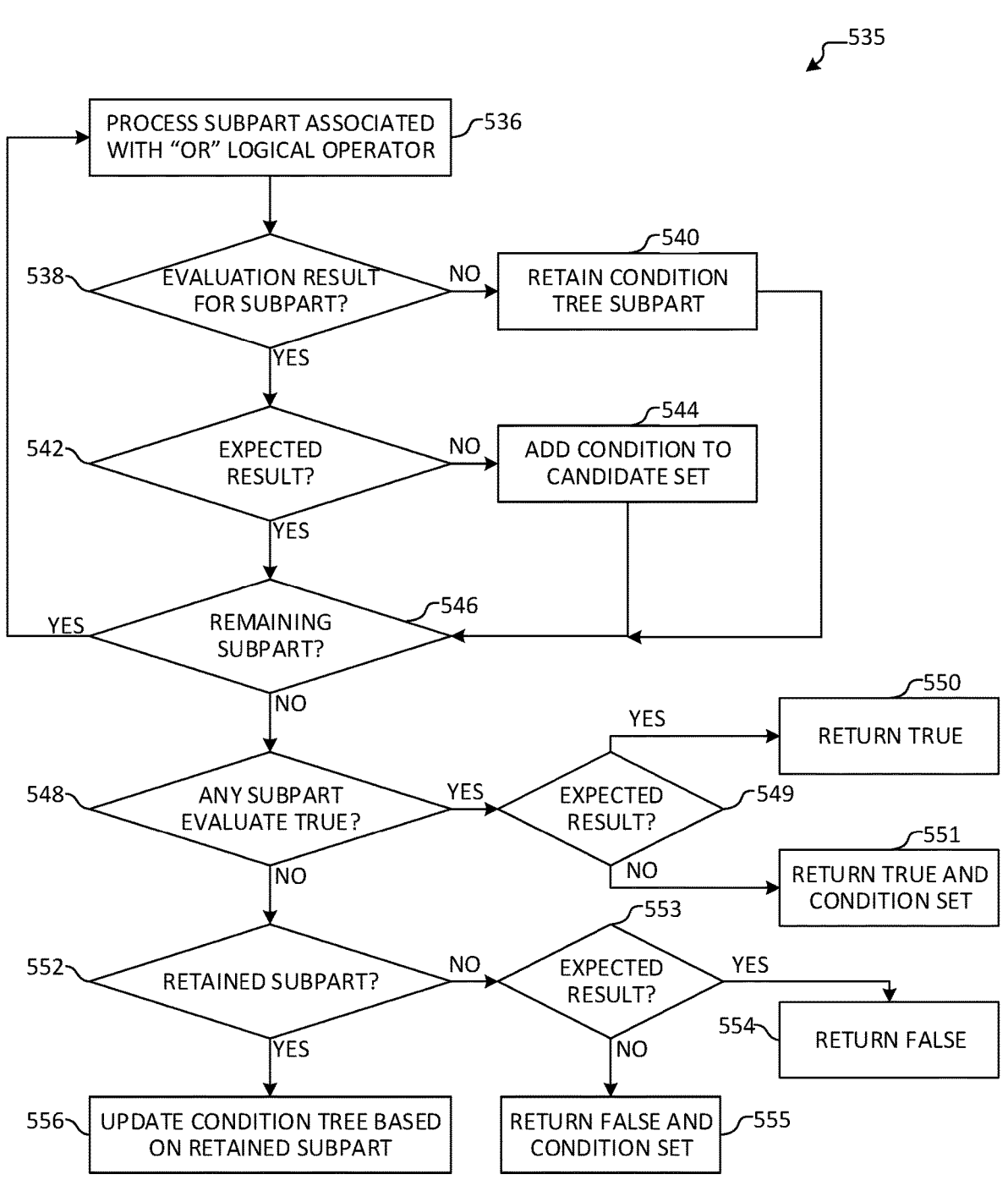
FIG. 5B illustrates an overview of an example method for processing an "or" operation of a condition tree to identify variables that affect the evaluation of the condition tree.

FIG. 5B illustrates an overview of an example method 535 for processing an "or" operation of a condition tree to identify variables that affect the evaluation of the condition tree. Aspects of method 535 may be performed as part of operations 520-532 discussed above with respect to method 500 in FIG. 5A. In examples, aspects of method 535 are performed by a static evaluation engine, such as static evaluation engine 116 of server device 102 in FIG. 1.

Method 535 begins at operation 536, where a subpart associated with an "or" logical operator is processed. As discussed above, the subpart may comprise a rule or another operator with one or more associated rules. For example, "or" operator 210 of condition tree 200 in FIG. 2A is associated with two subparts: rule 212 and rule 214. Accordingly, rule 212 and rule 214 may each be evaluated at operation 536 (e.g., rule 212 at the first iteration of operation 536 and rule 214 at the second iteration of operation 536, as a result of determining there is a remaining subpart at determination 546). In examples, operation 536 comprises performing aspects similar to those of method 500 for the subpart (e.g., similar to operations 520-532 for operators and operations 506-518 for rules therein). Such aspects may be performed recursively or iteratively.

At determination 538, it is determined whether there is a processing result for the subpart. As described above, in instances where the subpart is not dependent on a dynamic variable, a processing result may be generated for the subpart accordingly. By contrast, if the subpart is dependent on one or more dynamic variables, a processing result may not be generated for the subpart, such that the dynamic subpart can be evaluated at a later time (e.g., by a dynamic evaluation engine, such as dynamic evaluation engine 118 in FIG. 1).

If, at determination 538, it is determined that a processing result was not generated for the subpart, flow branches "NO" to operation 540, where the condition tree subpart is retained. For example, the "or" logical operator retains the dynamic subpart, such that a subsequent evaluation of the condition tree may be determined according to one or more dynamic variables on which the subpart and, by extension, the logical "or" operator depend. Flow then progresses to determination 546, which is discussed below.

However, if it is instead determined at determination 538 that there is a processing result for the subpart, flow branches "YES" to determination 542, where it is determined whether the evaluation result is expected or preferred. As discussed above, one or more processing results may ultimately cause a condition tree to yield a negative evaluation result. Accordingly, aspects of method 535 may identify rules associated with a negative evaluation result, such that associated variables may be changed in order to yield a positive evaluation result instead. In some examples, the determination comprises evaluating an indication as to a preferred processing result, which may be compared to the processing result that was generated at operation 536.

Accordingly, if, at determination 542 it is determined that the evaluation is not as expected, flow branches "NO" to operation 544, where the logical operator and/or one or more subparts are added to a candidate set Similar to determinations 512 and 526 discussed above with respect to FIG. 5A, determination 542 and/or operation 544 may further comprise determining whether any of the variables may be changed, such that only variables that are not fixed may be added to the candidate set or, as another example, operation 544 may not be performed in instances where all the variables are fixed. In examples, the candidate set comprises a set of nodes and/or associated variables that may be changed in order to yield a different rule processing result and/or a different model evaluation result. Flow progresses to determination 546, which is described below.

Returning to determination 542, if it is instead determined that the processing result is as expected, flow branches "YES" to determination 546, where it is determined whether there are any remaining condition tree subparts to process. As discussed above, a logical operator may have multiple associated subparts, such that operations 536-546 are performed accordingly. It will be appreciated that such aspects need not be performed iteratively, but may be performed recursively and/or contemporaneously in other examples. Thus, if it is determined that there is a remaining subpart, flow branches "YES" and returns to operation 536.

If, however, it is determined that there is not a remaining subpart, flow instead branches "NO" to determination 548, where it is determined whether any condition tree subparts evaluated to "true" (e.g., as were processed by an iteration of operation 536). Since method 535 is for processing an "or" logical operator, any instance of a subpart that evaluated to "true" means the processing result for the logical operator as a whole is "true." Accordingly, if any subpart evaluated to "true," flow branches "YES" to determination 549, where it is determined whether the evaluation result is expected or preferred, similar to the aspects discussed above with respect to determination 542. If it is determined that the evaluation result is expected or preferred, flow branches "YES" to operation 550, where "true" is returned for the logical operator. In such instances, any condition candidate set generated at operation 544 may not be returned, as the processing result of the logical operator is as-expected and is therefore not dependent on variables that may have caused an associated subpart to instead evaluate otherwise. In some examples, operation 550 comprises updating the condition tree to comprise the "true" processing result and to further omit the logical operator and its associated subtrees from the condition tree. Method 535 terminates at operation 550.

If it is instead determined at determination 549 that the evaluation result is not expected or preferred, flow instead branches "NO" to operation 551, where "true" is returned in combination with the condition set that was generated with operation 544. The condition set is returned to provide an indication as to one or more variables that may affect the evaluation result of the logical operator. In some examples, operation 551 comprises updating the condition tree to comprise the "true" processing result and to further omit the logical operator and its associated subtrees from the condition tree. Method 535 terminates at operation 551.

By contrast, if it is instead determined that no subparts evaluated to "true," flow instead branches "NO" to determination 552, where it is determined whether any subparts have been retained (e.g., as may have been retained by operation 540). For example, one or more subparts associated with the "or" logical operator may be dependent on a dynamic variable, such that an evaluation result was not determined for the subpart. If no subparts were retained (e.g., all subparts associated with the operator were evaluated) and no subparts evaluated "true" (e.g., such that flow branched "YES" at determination), flow branches "NO" to determination 553, where it is determined whether the evaluation result is expected or preferred, similar to the aspects discussed above with respect to determinations 542 and 549. If it is determined that the evaluation result is expected or preferred, flow branches "YES" to operation 554, where a "false" processing result is returned for the "or" logical operator. In some examples, operation 554 comprises updating the condition tree to comprise the "false" processing result and to further omit the logical operator and its associated subtrees from the condition tree. Method 535 terminates at operation 554.

If, however, it is instead determined that the evaluation result is not as expected or preferred, flow instead branches "NO" to operation 555, where a "false" processing result and an associated condition set is returned. As discussed above, the condition set is returned to provide an indication as to one or more variables that may affect the evaluation result of the logical operator. As a result, such variables may be changed in order to yield a different evaluation result. In some examples, operation 555 comprises updating the condition tree to comprise the "false" processing result and to further omit the logical operator and its associated subtrees from the condition tree. Method 535 terminates at operation 555.

By contrast, if it is determined at determination 552 that a condition tree subpart was retained, flow instead branches "YES" to operation 556 where the condition tree is updated based on the retained subpart. For example, if only a subset of the associated subparts yielded a processing result, one or more subparts may be omitted from the condition tree. In another example, the condition node may be replaced by an associated subpart, as may be the case when the associated subpart is the only remaining subpart left to evaluate (e.g., by a dynamic evaluation engine, in instances where other subparts that evaluated "false"). In some instances, operation 556 comprises providing an associated condition set for the "or" logical operator. For example, even though the logical operator did not evaluate true (e.g., as there is at least one dynamic subpart), there may be candidate variables that could change to cause another subpart to evaluate true. Method 535 terminates at operation 556.

Figure 5C:
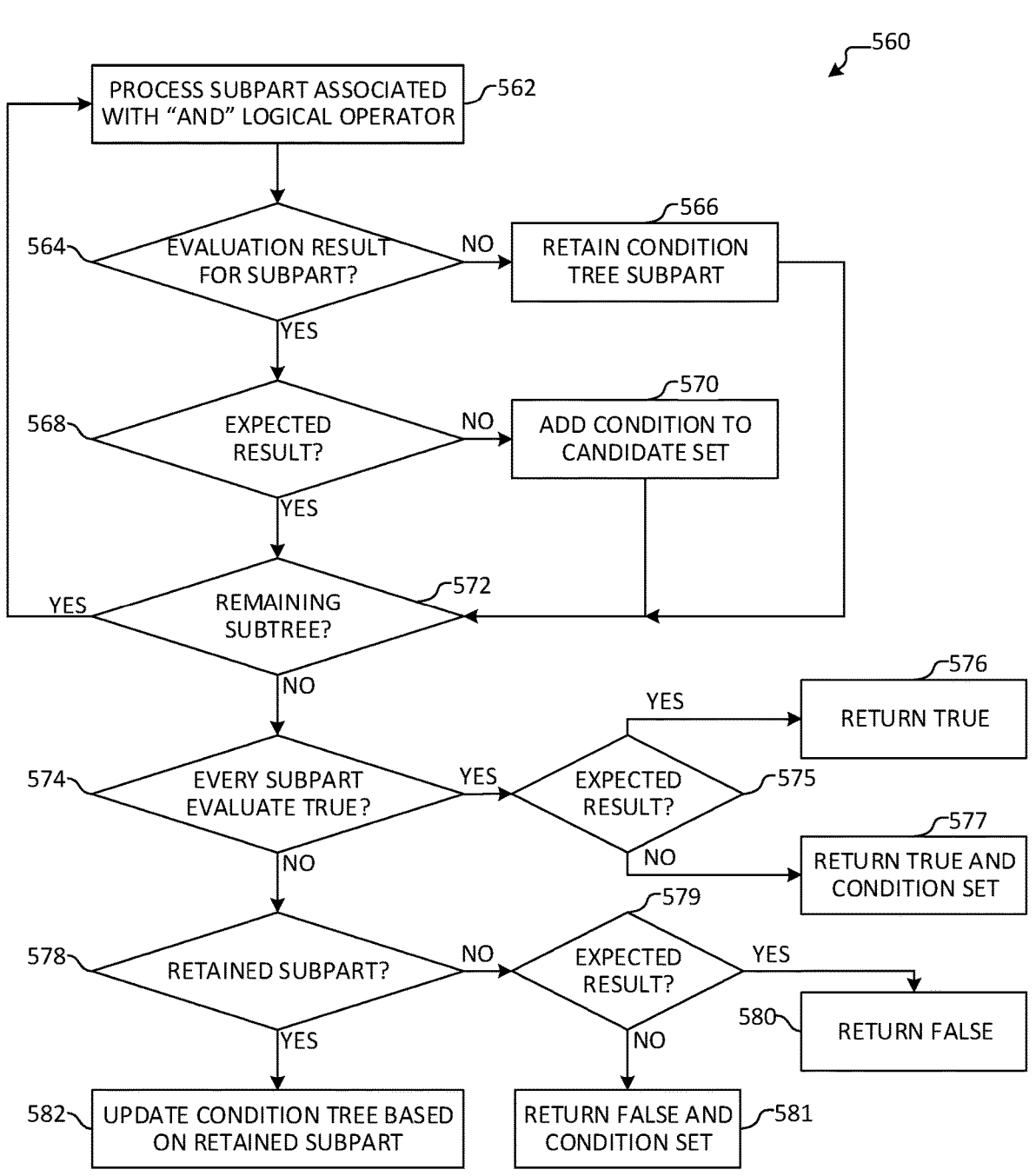
FIG. 5C illustrates an overview of an example method for processing an "and" operation of a condition tree to identify variables that affect the evaluation of the condition tree.

FIG. 5C illustrates an overview of an example method 560 for processing an "and" operation of a condition tree to identify variables that affect the evaluation of the condition tree. Aspects of method 560 may be performed as part of operations 520-532 discussed above with respect to method 500 in FIG. 5A. In examples, aspects of method 560 are performed by a static evaluation engine, such as static evaluation engine 116 of server device 102 in FIG. 1.

Method 560 begins at operation 562, where a subpart associated with an "and" logical operator is processed. As discussed above, the subpart may comprise a rule or another operator with one or more associated rules. For example, "and" operator 206 of condition tree 200 in FIG. 2A is associated with two subparts: rule 208 and subpart 216. Accordingly, rule 208 and subpart 216 may each be evaluated at operation 562 (e.g., rule 208 at the first iteration of operation 562 and subpart 216 at the second iteration of operation 562, as a result of determining there is a remaining subpart at determination 572). In examples, operation 562 comprises performing aspects similar to those of method 500 for the subpart (e.g., similar to operations 520-532 for operators and operations 506-518 for rules therein). Such aspects may be performed recursively or iteratively.

At determination 564, it is determined whether there is a processing result for the subpart. As described above, in instances where the subpart is not dependent on a dynamic variable, a processing result may be generated for the subpart accordingly. By contrast, if the subpart is dependent on one or more dynamic variables, a processing result may not be generated for the subpart, such that the dynamic subpart can be evaluated at a later time (e.g., by a dynamic evaluation engine, such as dynamic evaluation engine 118 in FIG. 1).

If, at determination 564, it is determined that a processing result was not generated for the subpart, flow branches "NO" to operation 566, where the condition tree subpart is retained. For example, the "and" logical operator retains the dynamic subpart, such that a subsequent evaluation of the condition tree may be determined according to one or more dynamic variables on which the subpart and, by extension, the logical "and" operator depend. Flow then progresses to determination 572, which is discussed below.

However, if it is instead determined at determination 564 that there is a processing result for the subpart, flow branches "YES" to determination 568, where it is determined whether the evaluation result is expected or preferred. As discussed above, one or more processing results may ultimately cause a condition tree to yield a negative evaluation result. Accordingly, aspects of method 560 may identify rules associated with a negative evaluation result, such that associated variables may be changed in order to yield a positive evaluation result instead. In some examples, the determination comprises evaluating an indication as to a preferred processing result, which may be compared to the processing result that was generated at operation 562.

Accordingly, if, at determination 568 it is determined that the evaluation is not as expected, flow branches "NO" to operation 570, where the logical operator and/or one or more subparts are added to a candidate set Similar to determinations 512 and 526 discussed above with respect to FIG. 5A, determination 568 and/or operation 570 may further comprise determining whether any of the variables may be changed, such that only variables that are not fixed may be added to the candidate set or, as another example, operation 570 may not be performed in instances where all the variables are fixed. In examples, the candidate set comprises a set of nodes and/or associated variables that may be changed in order to yield a different rule processing result and/or a different model evaluation result. Flow progresses to determination 572, which is described below.

Returning to determination 568, if it is instead determined that the processing result is as expected, flow branches "YES" to determination 572, where it is determined whether there are any remaining condition tree subparts to process. As discussed above, a logical operator may have multiple associated subparts, such that operations 562-572 are performed accordingly. It will be appreciated that such aspects need not be performed iteratively, but may be performed recursively and/or contemporaneously in other examples. Thus, if it is determined that there is a remaining subpart, flow branches "YES" and returns to operation 562.

If, however, it is determined that there is not a remaining subpart, flow instead branches "NO" to determination 574, where it is determined whether all of the condition tree subparts evaluated to "true" (e.g., as were processed by an iteration of operation 562). Since method 560 is for processing an "and" logical operator, the processing result for the logical operator will be "true" when every associated subpart evaluates to "true." Accordingly, if every subpart evaluated to "true," flow branches "YES" to determination 575, where it is determined whether the evaluation result is expected or preferred, similar to the aspects discussed above with respect to determination 568. If it is determined that the evaluation result is expected or preferred, flow branches "YES" to operation 576, where "true" is returned for the logical operator. In such instances, any candidate set generated at operation 570 may not be returned, as the processing result is as-expected. In some examples, operation 576 comprises updating the condition tree to comprise the "true" processing result and to further omit the logical operator and its associated subtrees from the condition tree. Method 560 terminates at operation 576.

If it is instead determined at determination 575 that the evaluation result is not expected or preferred, flow instead branches "NO" to operation 577, where "true" is returned in combination with the condition set that was generated with operation 570. The condition set is returned to provide an indication as to one or more variables that may affect the evaluation result of the logical operator. In some examples, operation 577 comprises updating the condition tree to comprise the "true" processing result and to further omit the logical operator and its associated subtrees from the condition tree. Method 560 terminates at operation 577.

By contrast, if it is instead determined that not all subparts evaluated to "true," flow instead branches "NO" to determination 578, where it is determined whether any subparts have been retained (e.g., as may have been retained by operation 566). For example, one or more subparts associated with the "and" logical operator may be dependent on a dynamic variable, such that an evaluation result was not determined for the subpart. If no subparts were retained (e.g., all subparts associated with the operator were evaluated) and any of the subparts evaluated "false" (e.g., such that flow branched "YES" at determination 574), flow branches "NO" to determination 579, where it is determined whether the evaluation result is expected or preferred, similar to the aspects discussed above with respect to determinations 568 and 575. If it is determined that the evaluation result is expected or preferred, flow branches "YES" to operation 582, where a "false" processing result is returned for the "and" logical operator. In some examples, operation 580 comprises updating the condition tree to comprise the "false" processing result and to further omit the logical operator and its associated subtrees from the condition tree. Method 560 terminates at operation 580.

If, however, it is instead determined that the evaluation result is not as expected or preferred, flow instead branches "NO" to operation 581, where a "false" processing result and an associated condition set is returned. As discussed above, the condition set is returned to provide an indication as to one or more variables that may affect the evaluation result of the logical operator. As a result, such variables may be changed in order to yield a different evaluation result. In some examples, operation 581 comprises updating the condition tree to comprise the "false" processing result and to further omit the logical operator and its associated subtrees from the condition tree. Method 560 terminates at operation 581.

By contrast, if it is determined at determination 578 that a condition tree subpart was retained, flow instead branches "YES" to operation 582 where the condition tree is updated based on the retained subpart. For example, if only a subset of the associated subparts yielded a processing result, one or more subparts may be omitted from the condition tree. In another example, the condition node may be replaced by an associated subpart, as may be the case when the associated subpart is the only remaining subpart left to evaluate (e.g., by a dynamic evaluation engine, in instances where other subparts that evaluated "true"). In some instances, operation 582 comprises providing an associated condition set for the "and" logical operator. For example, even though the logical operator did not evaluate to "true" or "false" (e.g., as there is at least one dynamic subpart), there may be candidate variables that could change to cause another subpart to evaluate true. Method 560 terminates at operation 582.

Figure 5D:
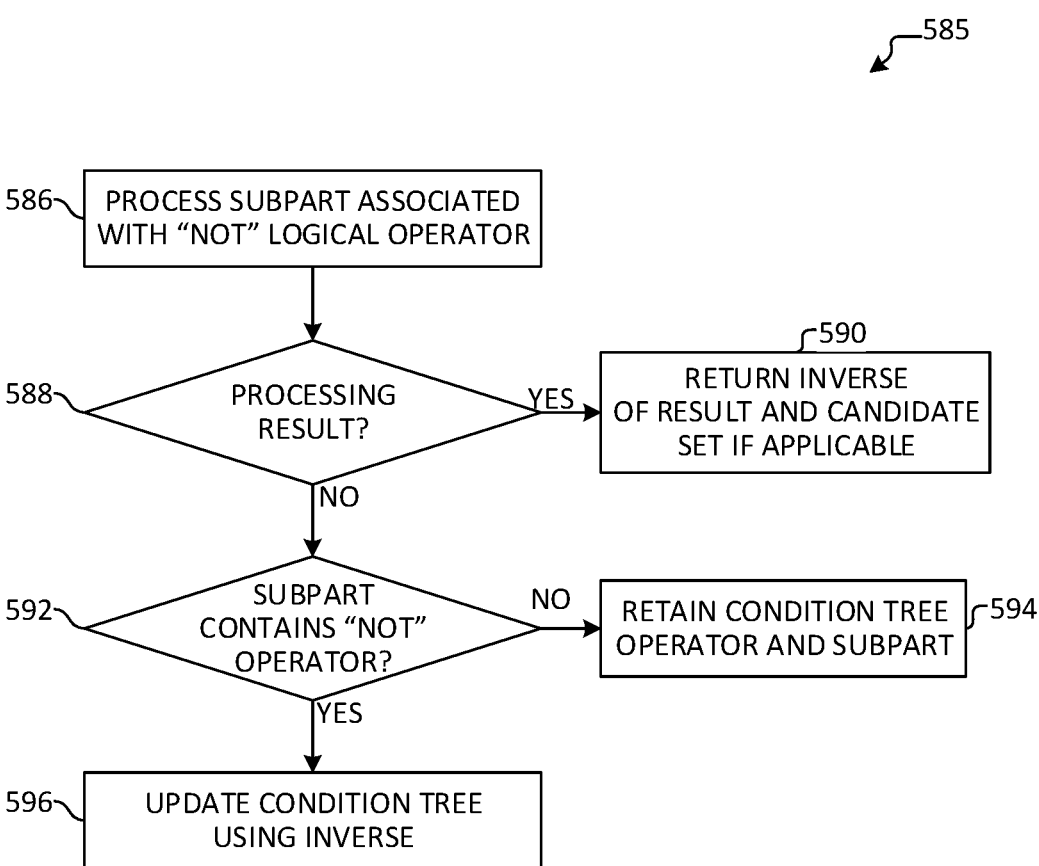
FIG. 5D illustrates an overview of an example method for processing a "not" operation of a condition tree to identify variables that affect the evaluation of the condition tree.

FIG. 5D illustrates an overview of an example method 585 for processing a "not" operation of a condition tree to identify variables that affect the evaluation of the condition tree. Aspects of method 585 may be performed as part of operations 520-532 discussed above with respect to method 500 in FIG. 5A. In examples, aspects of method 585 are performed by a static evaluation engine, such as static evaluation engine 116 of server device 102 in FIG. 1.

Method 585 begins at operation 586, where a subpart associated with a "not" logical operator is processed. As discussed above, the subpart may comprise a rule or another operator with one or more associated rules. In examples, operation 586 comprises performing aspects similar to those of method 500 for the subpart (e.g., similar to operations 520-532 for operators and operations 506-518 for rules therein). Such aspects may be performed recursively or iteratively. In some instances, operation 586 comprises providing an indication as to an expected or preferred processing result. The indication may be the inverse of an expected or preferred processing result received or otherwise accessed by method 585, as the "not" operator provides the inverse of the processing result for subparts associated therewith.

At determination 588, it is determined whether there is a processing result for the subpart. As described above, in instances where the subpart is not dependent on a dynamic variable, a processing result may be generated for the subpart accordingly. By contrast, if the subpart is dependent on one or more dynamic variables, a processing result may not be generated for the subpart, such that the dynamic subpart can be evaluated at a later time (e.g., by a dynamic evaluation engine, such as dynamic evaluation engine 118 in FIG. 1).

If, at determination 588, it is determined that a processing result was generated for the subpart, flow branches "YES" to operation 590, where the inverse of the processing result is returned. In instances where the processing result is not the expected or preferred processing result, operation 590 further comprises providing a candidate set as described above. For example, processing the subpart at operation 586 may yield a candidate set (e.g., as may be generated by operations 518 and/or 532 of method 500 in FIG. 5A, operations 544 and/or 554 of method 535 in FIG. 5B, and/or operations 570 and 570 of method 560 in FIG. 5C). In examples where the subpart is a rule, operation 590 may comprise identifying static variables that are not fixed such that they may be returned as a candidate set. In some instances, operation 590 comprises updating the condition tree to comprise the inverse of the processing result and to further omit the logical operator and its associated subtree from the condition tree. Method 685 terminates at operation 590.

However, if it is instead determined at determination 588 that there is not a processing result for the subpart, flow branches "NO" to determination 592, where it is determined whether the subpart comprises another "not" operator. Since method 585 is a method for evaluating a "not" operator, two "not" operator nodes (e.g., directly connected in the condition tree such as by a parent/child relationship) would effectively yield the same processing result as a condition tree in which both "not" operator nodes were omitted.

Accordingly, if the condition tree subpart does not contain a "not" operator, flow branches "NO" to operation 594, where the operator and associated subpart are retained within the condition tree. Flow terminates at operation 594. If, however, the subpart contains a "not" operator, flow instead branches "YES" to operation 596, where the condition tree is updated to omit the "not" logical operator that was processed at operation 586 and the not operator in the subpart, thereby omitting both not operators and simplifying the condition tree accordingly. Flow terminates at operation 596.

Figure 6:
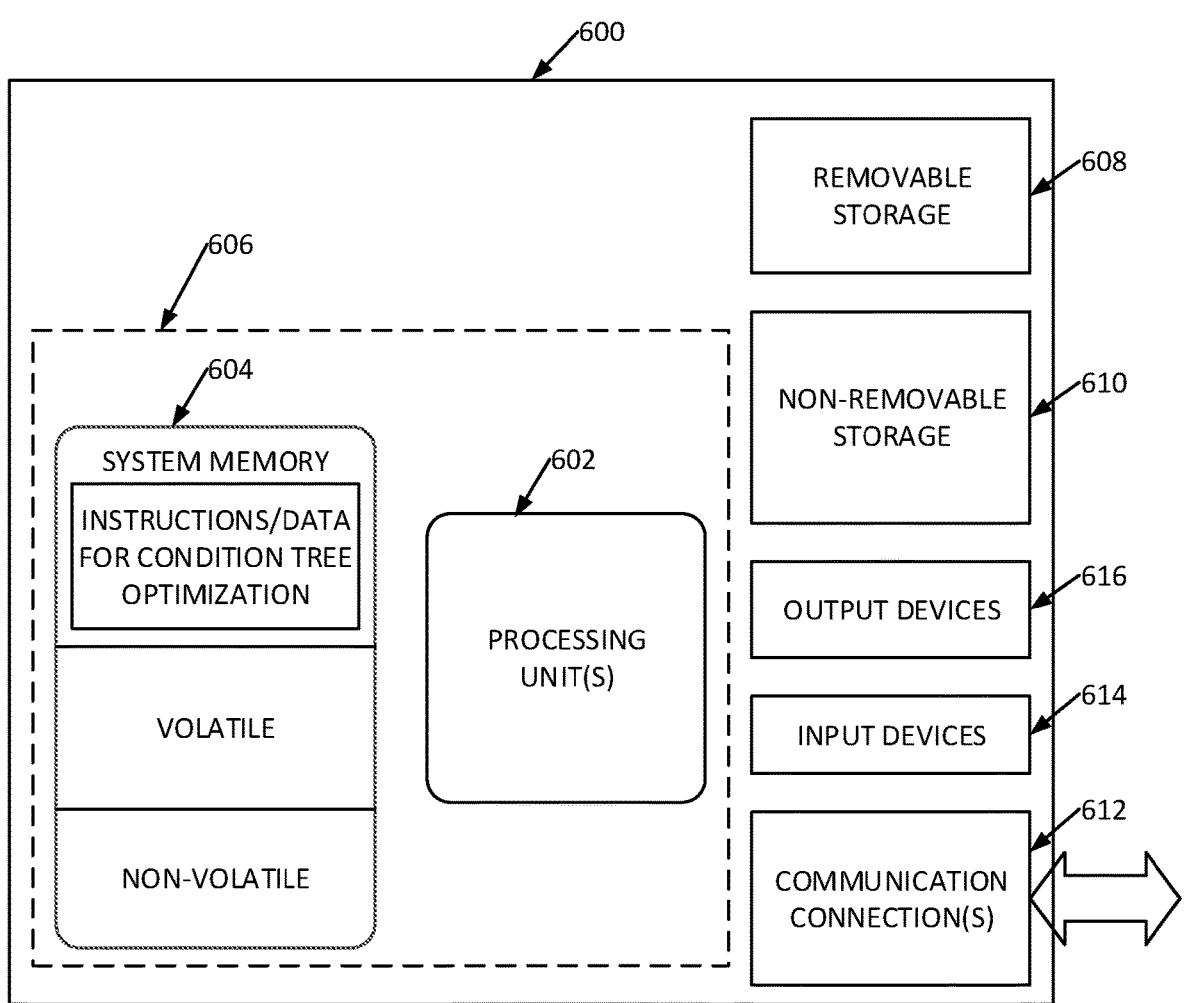
FIG. 6 illustrates an example of a suitable operating environment in which one or more aspects of the present application may be implemented.

FIG. 6 illustrates an example of a suitable operating environment 600 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 600 typically may include at least one processing unit 602 and memory 604. Depending on the exact configuration and type of computing device, memory 604 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 6 by dashed line 606. Further, environment 600 may also include storage devices (removable, 608, and/or non-removable, 610) including, but not limited to, magnetic or optical disks or tape. Similarly, environment 600 may also have input device(s) 614 such as a keyboard, mouse, pen, voice input, etc. and/or output device(s) 616 such as a display, speakers, printer, etc. Also included in the environment may be one or more communication connections, 612, such as LAN, WAN, point to point, etc.

Operating environment 600 may include at least some form of computer readable media. The computer readable media may be any available media that can be accessed by processing unit 602 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 604. While executing on the processing unit 602, program modules (e.g., applications, Input/Output (I/O) management, and other utilities) may perform processes including, but not limited to, one or more of the stages of the operational methods described herein such as the methods illustrated in FIGS. 3, 4A-D, and 5A-D, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 600 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

As will be understood from the foregoing disclosure, one aspect of the technology relates to a system comprising: at least one processor; and memory storing instructions that, when executed by the at least one processor, causes the system to perform a set of operations. The set of operations comprises: receiving a context comprising a set of static variables and a set of dynamic variables; identifying a static subpart of the condition tree; processing the static subpart based at least in part on the set of static variables to generate a processing result for the static subpart; generating an optimized condition tree comprising the processing result in place of the static subpart; processing the optimized condition tree according to a first value set for the set of dynamic variables to generate an evaluation result; and providing an indication of the evaluation result. In an example, the evaluation result is a first evaluation result and the set of operations further comprises: processing the optimized condition tree according to a second value set for the set of dynamic variables to generate a second evaluation result, wherein a dynamic variable of the set of dynamic variables has a different associated value in the first value set as compared to the second value set. In another example, processing the optimized condition tree according to the first value set and processing the optimized condition tree according to the second value set each comprise using the processing result to generate the first evaluation result and the second evaluation result, respectively. In a further example, generating the optimized condition tree further comprises identifying a set of candidate variables that result in an evaluation result different than a preferred evaluation result. In yet another example, the condition tree comprises a logical operator associated with the static subpart and a dynamic subpart; and generating the optimized condition tree further comprises updating the logical operator of the condition tree to omit the static subpart and retain the dynamic subpart. In a further still example, the condition tree comprises a logical operator associated with the static subpart and a dynamic subpart; and generating the optimized condition tree further comprises replacing the logical operator of the condition tree with the dynamic subpart. In another example, the context comprises variables associated with at least one of: a user; a property; or a financial instrument.

In another aspect, the technology relates to a method for identifying a set of candidate variables for change associated with a condition tree. The method comprises: receiving a context comprising a set of static variables and a set of dynamic variables; processing a rule of the condition tree to determine the rule is associated with a negative evaluation effect; evaluating a variable associated with the rule to determine whether the variable is a fixed variable; based on determining the variable is not a fixed variable: storing the variable in the set of candidate variables; and providing an indication of the set of candidate variables. In an example, the method further comprises receiving a set of fixed variables from a third-party data source, wherein evaluating the variable to determine whether the variable is a fixed variable comprises determining whether the variable is in the set of fixed variables. In another example, the condition tree is generated based at least in part on data from the third-party data source. In a further example, the rule comprises a static subpart of the condition tree and is associated with a static variable of the set of static variables. In yet another example, the method further comprises ranking the set of candidate variables according to a respective ease of change as compared to other variables of the set of candidate variables. In a further still example, determining the rule is associated with the negative evaluation effect comprises determining that a processing result of the rule causes an evaluation result of the condition tree to be different from a preferred evaluation result. In another example, the context comprises variables associated with at least one of: a user; a property; or a financial instrument.

In a further aspect, the technology relates to a method for generating an optimized condition tree. The method comprises: receiving a context comprising a set of static variables and a set of dynamic variables; identifying a static subpart of the condition tree; processing the static subpart based at least in part on the set of static variables to generate a processing result for the static subpart; generating an optimized condition tree comprising the processing result in place of the static subpart; processing the optimized condition tree according to a first value set for the set of dynamic variables to generate an evaluation result; and providing an indication of the evaluation result. In an example, the evaluation result is a first evaluation result and the method further comprises: processing the optimized condition tree according to a second value set for the set of dynamic variables to generate a second evaluation result, wherein a dynamic variable of the set of dynamic variables has a different associated value in the first value set as compared to the second value set. In another example, processing the optimized condition tree according to the first value set and processing the optimized condition tree according to the second value set each comprise using the processing result to generate the first evaluation result and the second evaluation result, respectively. In a further example, the condition tree comprises a logical operator associated with the static subpart and a dynamic subpart; and generating the optimized condition tree further comprises updating the logical operator of the condition tree to omit the static subpart and retain the dynamic subpart. In yet another example, the condition tree comprises a logical operator associated with the static subpart and a dynamic subpart; and generating the optimized condition tree further comprises replacing the logical operator of the condition tree with the dynamic subpart. In a further still example, the context comprises variables associated with at least one of: a user; a property; or a financial instrument.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:

at least one processor; and memory storing instructions that, when executed by the at least one processor, causes the system to perform a set of operations, the set of operations comprising:

receiving a context comprising a set of static variables and a set of dynamic variables;

identifying a static subpart of a condition tree data structure, wherein the condition tree data structure is stored in the memory;

processing the static subpart of the condition tree data structure in the memory, based at least in part on the set of static variables, to generate a processing result for the static subpart;

generating a processed condition tree data structure in the memory comprising the processing result in place of the static subpart, thereby generating the processed condition tree data structure having reduced memory consumption as compared to the condition tree data structure;

processing the processed condition tree data structure according to a first value set for the set of dynamic variables to generate an evaluation result based at least in part on the processing result of the processed condition tree data structure; and providing an indication of the evaluation result.

2. The system of claim 1, wherein the evaluation result is a first evaluation result and the set of operations further comprises:

processing the processed condition tree data structure according to a second value set for the set of dynamic variables to generate a second evaluation result, wherein a dynamic variable of the set of dynamic variables has a different associated value in the first value set as compared to the second value set.

3. The system of claim 2, wherein processing the processed condition tree data structure according to the first value set and processing the processed condition tree data structure according to the second value set each comprise using the processing result to generate the first evaluation result and the second evaluation result, respectively.

4. The system of claim 1, wherein generating the processed condition tree further comprises identifying a set of candidate variables that result in an evaluation result different than a preferred evaluation result.

5. The system of claim 1, wherein:

the condition tree data structure comprises a logical operator associated with the static subpart and a dynamic subpart; and generating the processed condition tree data structure further comprises updating the logical operator of the condition tree data structure to omit the static subpart and retain the dynamic subpart within the processed condition tree data structure in the memory.

6. The system of claim 1, wherein:

the condition tree data structure comprises a logical operator associated with the static subpart and a dynamic subpart; and generating the processed condition tree data structure further comprises replacing the logical operator of the condition tree with the dynamic subpart within the processed condition tree data structure in the memory.

7. The system of claim 1, wherein the context comprises variables associated with at least one of:

a user;

a property; or a financial instrument.

8. A method for identifying a set of candidate variables for change associated with a condition tree data structure, comprising:

receiving a context comprising a set of static variables and a set of dynamic variables;

processing, in memory, a rule of the condition tree data structure to determine the rule is associated with a negative evaluation effect;

evaluating a variable associated with the rule in memory to determine whether the variable is a fixed variable; and based on determining the variable is not a fixed variable for the condition tree data structure in memory:

storing the variable in the set of candidate variables; and providing an indication of the set of candidate variables.

9. The method of claim 8, further comprising receiving a set of fixed variables from a third-party data source, wherein evaluating the variable to determine whether the variable is a fixed variable comprises determining whether the variable is in the set of fixed variables.

10. The method of claim 9, wherein the condition tree data structure is generated based at least in part on data from the third-party data source.

11. The method of claim 8, wherein the rule comprises a static subpart of the condition tree and is associated with a static variable of the set of static variables.

12. The method of claim 8, further comprising ranking the set of candidate variables according to a respective ease of change as compared to other variables of the set of candidate variables.

13. The method of claim 8, wherein determining the rule is associated with the negative evaluation effect comprises determining that a processing result of the rule causes an evaluation result of the condition tree data structure to be different from a preferred evaluation result.

14. The method of claim 8, wherein the context comprises variables associated with at least one of:

a user;

a property; or a financial instrument.

15. A method for generating a processed condition tree, comprising:

receiving a context comprising a set of static variables and a set of dynamic variables;

identifying a static subpart of the condition tree data structure, wherein the condition tree data structure is stored in memory;

processing the static subpart of the condition tree data structure in the memory, based at least in part on the set of static variables, to generate a processing result for the static subpart;

generating a processed condition tree data structure in the memory comprising the processing result in place of the static subpart, thereby generating the processed condition tree data structure having reduced memory consumption as compared to the condition tree data structure;

processing the processed condition tree data structure according to a first value set for the set of dynamic variables to generate an evaluation result based at least in part on the processing result of the processed condition tree data structure; and providing an indication of the evaluation result.

16. The method of claim 15, wherein the evaluation result is a first evaluation result and the method further comprises:

processing the processed condition tree data structure according to a second value set for the set of dynamic variables to generate a second evaluation result, wherein a dynamic variable of the set of dynamic variables has a different associated value in the first value set as compared to the second value set.

17. The method of claim 16, wherein processing the processed condition tree data structure according to the first value set and processing the processed condition tree data structure according to the second value set each comprise using the processing result to generate the first evaluation result and the second evaluation result, respectively.

18. The method of claim 15, wherein:

the condition tree data structure comprises a logical operator associated with the static subpart and a dynamic subpart; and generating the processed condition tree data structure further comprises updating the logical operator of the condition tree to omit the static subpart and retain the dynamic subpart.

19. The method of claim 15, wherein:

the condition tree data structure comprises a logical operator associated with the static subpart and a dynamic subpart; and generating the processed condition tree data structure further comprises replacing the logical operator of the condition tree data structure with the dynamic subpart within the processed condition tree data structure in the memory.

20. The method of claim 15, wherein the context comprises variables associated with at least one of:

a user;

a property; or a financial instrument.

* * * * *